US012570105B2

(12) United States Patent
Weiss

(10) Patent No.: US 12,570,105 B2
(45) Date of Patent: Mar. 10, 2026

(54) ARTICULATING DRIVE SHAFT ARRANGEMENT FOR VEHICLE

(71) Applicant: Weiss Nominees Pty Ltd, Scarborough (AU)

(72) Inventor: Jan Weiss, Scarborough (AU)

(73) Assignee: WEISS NOMINEES PTY LTD, Scarborough (AU)

( * ) Notice: Subject to any disclaimer, the term of this patent is extended or adjusted under 35 U.S.C. 154(b) by 0 days.

(21) Appl. No.: 19/130,473

(22) PCT Filed: Nov. 24, 2023

(86) PCT No.: PCT/AU2023/051211
§ 371 (c)(1),
(2) Date: May 15, 2025

(87) PCT Pub. No.: WO2024/108272
PCT Pub. Date: May 30, 2024

(65) Prior Publication Data
US 2025/0381800 A1      Dec. 18, 2025

(30) Foreign Application Priority Data
Nov. 24, 2022    (AU) ................................. 2022903558

(51) Int. Cl.
*B60B 35/00*      (2006.01)
*B60B 35/12*      (2006.01)
*B62D 9/02*      (2006.01)

(52) U.S. Cl.
CPC .......... *B60B 35/009* (2013.01); *B60B 35/125* (2013.01); *B60B 35/128* (2013.01); *B62D 9/02* (2013.01)

(58) Field of Classification Search
CPC ... B60B 35/009; B60B 35/125; B60B 35/128; B62D 9/02
See application file for complete search history.

(56) References Cited

U.S. PATENT DOCUMENTS 5,308,095 A * 5/1994 Fabris .................. B60B 35/003
280/137.5
6,390,928 B1 5/2002 Welschof
(Continued)

FOREIGN PATENT DOCUMENTS

| KR | 102169726 | 10/2020 |
| WO | 2013083442 | 6/2013 |

OTHER PUBLICATIONS

International Search Report issued in App. No. PCT/AU2023/051211, dated Feb. 22, 2024, 6 pages.

*Primary Examiner* — Jason D Shanske
*Assistant Examiner* — Matthew James O'Neill
(74) *Attorney, Agent, or Firm* — VIA LLP

(57) ABSTRACT

An axle arrangement having an outer bevel gear arrangement and an inner bevel gear arrangement. Each bevel gear arrangement allowing large rotation of the axle shaft around a respective swing axis through the bevel gear arrangement, perpendicular to the axle shaft to permit the axle to swing through large angles with negligible impact on transmission of torque. The axle shaft having multiple portions connected in series between the bevel gear arrangements. Between two of the shaft portions is a slidable connection. Between two of the shaft portions is an inner rotatable coupling and between two of the shaft portions is an outer rotatable coupling. Both couplings are stabilised by hinged casings located relative to the bevel gear arrangements with a hinge axis through the rotatable coupling. Each hinge axis is perpendicular to the primary axis of the shaft portion(s) between the rotatable couplings and perpendicular to the respective swing axis.

15 Claims, 18 Drawing Sheets

(56) References Cited

U.S. PATENT DOCUMENTS

| | | | |
|---|---|---|---|
| 11,370,262 | B2 | 6/2022 | Weiss |
| 11,884,347 | B2 | 1/2024 | Weiss |
| 2005/0077098 | A1* | 4/2005 | Takayanagi .............. B62K 5/10 |
| | | | 180/215 |
| 2013/0240282 | A1 | 9/2013 | Bindl |
| 2020/0262266 | A1* | 8/2020 | Weiss ....................... B60G 9/02 |
| 2021/0001667 | A1 | 1/2021 | Davis |
| 2022/0163068 | A1 | 5/2022 | Park |

* cited by examiner

ARTICULATING DRIVE SHAFT ARRANGEMENT FOR VEHICLE

TECHNICAL FIELD

The present invention relates to drive shafts for transmitting torque or rotational power and in particular to drive shafts arrangements able to transmit power to wheels through large angles due to wheel displacement and/or wheel tilt rotation.

BACKGROUND

Drive shafts are well known in vehicles, for transmitting torque or rotational power from an engine or gearbox of a vehicle to a wheel hub to drive a wheel of the vehicle. To accommodate for the vertical displacement of the wheel relative to the body (and gearbox), drive shaft arrangements typically employ some form of universal joint or other coupling to transmit the rotation through an angle that varies with the vertical displacement of the wheel. Due to the non-linear characteristics of speed and torque transmission versus rotational angle of a basic universal joint, constant velocity (CV) joints are usually used. The CV joints also typically incorporate a plunge action to accommodate the small changes in length required of the drive shaft due to its angular displacement in a primarily vertical lateral plane.

While CV joints can transmit torque and rotational power through large angles, such as up to fifty degrees, they are usually only required to do so at low speeds. This is due to the main application of such high angle CV joints being in extreme off-road vehicle applications where independently suspended wheels can have far greater vertical travel (displacement range) than on-road vehicles and even mainstream four-wheel drive vehicles. In these low-speed applications, the losses and inefficiencies of a CV joint and the non-linear transmission of torque through the driving rotation (as opposed to articulating rotation) of the drive shaft at large angles does not generate significant problems, other than some increase in wear and tear.

Tilting vehicles are another application where high angle CV joints or similar are required. However, as the tilt angle can be determined by lateral acceleration of the vehicle, the performance characteristics at large articulation rotations is of great significance. As the angle of the joints in the drive shaft assembly increases with tilt angle, the reduction of torque transmitted increases due to increased friction in for example constant velocity joints at large angles, and this can lead to a noticeable change in power at the wheel from upright travelling straight ahead to leaning over in a high lateral acceleration corner. In a tilting vehicle where the control of tilt angle is primarily passive, i.e. driver balanced, a noticeable change in transmitted power to the wheels will change the required balance point. Similarly, as the vehicles returns upright, the CV joint efficiency increases so more power returns to the wheel driven by the drive shaft.

Furthermore, in tilting vehicles such as shown in the applicant's U.S. Pat. No. 11,370,262, the suspension arrangement between the wheel and the body absorbs bumps by displacing in a direction that lies through or parallel to a plane through the tyre of the wheel. This is typically inclined at the same or similar angle to the body. So when cornering, the body and wheels can be tilted at for example over forty-five degrees away from vertical and any bumps encountered by a wheel are absorbed by the wheel displacing in a plane inclined at that same over forty-five degree angle to vertical. This creates a requirement for the length of the driveshaft to change by far greater than the twenty millimetres typically accommodated by the plunge in a CV joint. In the applicant's prior patent, the vehicle is either a three-wheeler which has a single driven rear wheel able to utilise existing motorcycle drive arrangements, or a four-wheeler where the two driven rear wheels are driven by motors mounted in the wheel hub assembly, adding the weight of the motors to the unsprung mass.

SUMMARY OF INVENTION

According to a first aspect of the invention there is provided an axle assembly for a vehicle, the axle assembly including: at least one swinging shaft portion 50 having a swinging shaft axis and including an outer end 54; an outer rotatable coupling 55 connected between the outer end 54 of the at least one swinging shaft portion 50 and a shaft outer bevel gear 56; the shaft outer bevel gear 56 engaging with at least one intermediate outer bevel gear 58, 60 in turn engaging with an output bevel gear 61 on a wheel shaft 62; the wheel shaft 62 having a primary axis being the wheel shaft axis and being located relative to a wheel hub assembly 25; the at least one intermediate outer bevel gear 58, 60 rotating about an intermediate outer bevel gear axis substantially perpendicular to the wheel shaft axis; an outer gear carrier 64 rotatably mounted to the wheel hub assembly 25, being rotatable relative to the wheel hub assembly about the intermediate outer bevel gear axis; the shaft outer bevel gear 56 being located by the outer gear carrier 64 and able to rotate relative to the outer gear carrier about a shaft outer bevel gear axis substantially perpendicular to the intermediate outer bevel gear axis; an outer shaft locator 66 being pivotally connected to the outer gear carrier 64, to pivot about an outer shaft locator pivot axis substantially perpendicular to the swinging shaft axis and passing through the outer rotatable coupling 55, the outer end 54 of the at least one swinging shaft portion 50 located by the outer shaft locator 66 and able to rotate relative to the outer shaft locator about the swinging shaft axis.

The at least one swinging shaft portion 50 may include an inner or first swinging shaft portion 51 and an outer or second swinging shaft portion 52, the inner and outer swinging shaft portions 51, 52 being slidably connected to enable a total length of the at least one swinging shaft portion 50 to vary along the swinging shaft axis; the inner and outer swinging shaft portions 51, 52 being drivably connected such that rotation of the inner and outer swinging shaft portions about the swinging shaft axis are equal.

The axle assembly may include a ball spline between the inner and outer swinging shaft portions 51, 52 to provide the slidable connection 53 and to provide the drivable connection. For example, the ball spline may preferably be a stroke ball spline.

The outer rotatable coupling 55 may be a form of universal joint or constant velocity joint.

The axle assembly may include: an inner rotatable coupling 71 connected between an inner end 70 of the at least one swinging shaft portion 50 and a shaft inner bevel gear 72; the shaft inner bevel gear engaging directly or indirectly with an input bevel gear 77 on an input shaft 78; the input shaft 78 having a primary axis being the input shaft axis and being located in an inner gear carrier 80; the inner gear carrier rotatably mounted to the vehicle chassis, subframe or body, being rotatable about the input shaft axis; the shaft inner bevel gear 72 being located by the inner gear carrier 80 and able to rotate relative to the inner gear carrier about a shaft inner bevel gear axis substantially perpendicular to the input bevel gear axis; an inner shaft locator 82 being pivotally connected to the inner gear carrier 80, to pivot about an axis substantially perpendicular to the swinging shaft axis, the inner end 70 of the at least one swinging shaft portion 50 being located by the inner shaft locator 82 and able to rotate relative to the inner shaft locator about the swinging shaft axis.

The axle assembly may be used on a vehicle with independent suspension where the drive shaft rotates through an angle of at least forty degrees through full suspension travel from suspension full compression to suspension full extension. For example the vehicle may be a four-wheel drive and/or the independent suspension may comprise double wishbones or other independent wheel locating geometry.

Alternatively, the axle assembly may be used on a tilting vehicle where the drive shaft rotates through an angle of at least forty degrees through a combination of full tilt angle of a body and of wheels of the tilting vehicle and/or full suspension travel from suspension full compression to suspension full extension.

The inner rotatable coupling 71 may be a form of universal joint or constant velocity joint.

The input shaft 78 may be directly or indirectly driven by a motor.

The vehicle may be a tilting vehicle, including at least one front wheel and at least a back left wheel 23 and a back right wheel 24; one said axle assembly being a back left axle assembly 41 provided for the back left wheel and another said axle assembly being a back right axle assembly 42 provided for the back right wheel; the respective back left and back right wheels being connected to a respective wheel hub assembly 25, 26, each slidably mounted on a respective suspension upright 27, 28; the back left suspension upright 27 being pivotally or rotatably connected to the back right suspension upright 28 by at least a main bridge 33; the main bridge being pivotally connected to a body of the tilting vehicle, at least one additional suspension geometry link 34 pivotally connected between the body and the back left and/or back right suspension upright. The additional suspension geometry link may be a second bridge or individual left right links. The back left and back right wheels 23, 24, the respective hub assemblies 25, 26, respective suspension uprights 27, 28, the main bridge 33 and the at least one additional suspension geometry link 34 together forming at least a portion of a back suspension arrangement 20 for the tilting vehicle.

For each axle assembly: the at least one swinging shaft portion 50, 90 may include an inner or first swinging shaft portion 51, 91 and an outer or second swinging shaft portion 52, 92, the inner and outer swinging shaft portions being slidably connected to enable a total length of the at least one swinging shaft portion 50 to vary along the axle axis; the inner and outer swinging shaft portions being drivably connected such that rotation of the inner and outer swinging drive shaft portions about the swinging shaft axis are equal.

An input shaft 78 of the back left axle assembly 41 and an input shaft 118 of the back right axle assembly 42 may be directly or indirectly driven by at least one motor or are driven by a respective motor 43, 44.

The at least one motor or the respective motor 43, 44 may be mounted to the main bridge 33. A respective inner rotatable coupling may be provided between the (or the respective) motor and the respective input shaft.

When the at least one motor or the respective motor 43, 44 is mounted to a subframe or to the body; a respective back left or back right motor drive transfer shaft may be mounted to the main bridge 33. A respective inner rotatable coupling may be provided between the (or the respective) motor and the respective input shaft.

The at least one motor or the respective motor 43, 44 may be mounted to a subframe or to the body of the tilting vehicle, each axle assembly 41, 42 including: an inner rotatable coupling 71, 11 connected between an inner end 70, 110 of the at least one swinging shaft portion 50, 90 and a shaft inner bevel gear 72, 112; the shaft inner bevel gear engaging with at least one intermediate inner bevel gear, in turn engaging with an input bevel gear 77, 117 on the input shaft 78, 118; the input shaft 118 having a primary axis being the input shaft axis and being located in an inner bevel gear housing; the at least one intermediate inner bevel gear rotating about an intermediate inner bevel gear axis substantially perpendicular to the input shaft axis; an inner gear carrier 80, 120 rotatably mounted to the inner bevel gear housing, being rotatable relative to the inner bevel gear housing about the intermediate inner bevel gear axis; the shaft inner bevel gear 72, 112 being located by the inner gear carrier 80, 120 and able to rotate relative to the inner gear carrier about a shaft inner bevel gear axis substantially perpendicular to the intermediate inner bevel gear axis; an inner shaft locator 82, 122 being pivotally connected to the inner gear carrier 80, 120, to pivot about an inner shaft locator pivot axis substantially perpendicular to the swinging shaft axis and passing through the inner rotatable coupling 71, 111, the inner end 70, 110 of the at least one swinging shaft portion 50 located by the inner shaft locator 82, 122 and able to rotate relative to the inner shaft locator about the swinging shaft axis.

When the input shaft of the axle assembly is longitudinally oriented, the intermediate gear(s) may be required to provide the large rotation angles of the at least one swinging shaft portion about a substantially longitudinal axis of the vehicle during large angle tilting motions of the vehicle and during suspension travel.

Alternatively, the at least one motor or the respective motor 43, 44 may be mounted to a subframe or to the body of the tilting vehicle, each axle assembly 41, 42 including: an inner rotatable coupling 71, 111 connected between an inner end 70, 110 of the at least one swinging shaft portion 50, 90 and a shaft inner bevel gear 72, 112; the shaft inner bevel gear engaging with an input bevel gear 77, 117 on the input shaft 78, 118; the input shaft having a primary axis being the input shaft axis and being located in an inner bevel gear housing; an inner gear carrier 80, 120 rotatably mounted to the inner bevel gear housing, being rotatable relative to the inner bevel gear housing about the input shaft axis; the shaft inner bevel gear 72, 112 being located by the inner gear carrier 80, 120 and able to rotate relative to the inner gear carrier about a shaft inner bevel gear axis substantially perpendicular to the input shaft axis; an inner shaft locator 82, 122 being pivotally connected to the inner gear carrier 80, 120, to pivot about an inner shaft locator pivot axis substantially perpendicular to the swinging shaft axis, the inner end 70, 110 of the at least one swinging shaft portion 50, 90 located by the inner shaft locator 82, 122 and able to rotate relative to the inner shaft locator about the swinging shaft axis, the inner shaft locator pivot axis passing through the inner rotatable coupling 71, 111.

When the input shaft 78, 118 of the axle assembly is laterally oriented, there may be no need for the intermediate bevel gear(s) as the at least one swinging shaft portion 50, 90 can rotate to large angles about a substantially longitudinal vehicle axis during large angle tilting motions of the vehicle and during suspension travel.

According to another aspect of the invention there is provided an axle assembly including: an inner shaft 73, a swinging shaft 50 and an outer shaft 57; the inner shaft 73 having a primary axis that is constrained to resist motion relative to a vehicle chassis, subframe or body in three mutually perpendicular linear directions (i.e. all linear directions) and be free to spin about a rotational direction that is around the inner shaft primary axis; the outer shaft 57 having a primary axis that is constrained to resist motion relative to a wheel hub assembly in three mutually perpendicular linear directions and is free to spin about a rotational direction that is around the outer shaft primary axis; the swinging shaft having a primary axis and including an inner end and an outer end; an inner rotatable coupling 71 is connected between the inner end 70 of the swinging shaft 50 and the inner shaft 73; the inner shaft 73 including a shaft inner bevel gear 72 engaging directly or indirectly with an input bevel gear 77 rotatable about an input bevel gear spinning axis; the input bevel gear spinning axis being located in an inner gear carrier 80; the inner gear carrier 80 being rotatably mounted relative to the vehicle chassis, subframe or body about an axis that is both perpendicular to the inner shaft primary axis and perpendicular to a horizontal axis perpendicular to the inner shaft primary axis; the shaft inner bevel gear 72 being located by the inner gear carrier 80 and able to rotate relative to the inner gear carrier about the inner shaft primary axis; an inner shaft locator 82 being pivotally connected to the inner gear carrier 80, to pivot about an inner shaft locator pivot which passes through the inner rotatable coupling and is both perpendicular to the swinging shaft primary axis and is perpendicular to a horizontal axis perpendicular to the swinging shaft primary axis; the inner end of the swinging shaft being located by the inner shaft locator 82 and able to rotate relative to the inner shaft locator about the swinging shaft primary axis.

An outer rotatable coupling 55 may be connected between the outer end 54 of the swinging shaft 50 and the outer shaft 57. The outer shaft may include a shaft outer bevel gear 56 engaging directly or indirectly with an output bevel gear (61) on a wheel shaft 62, the wheel shaft having a primary axis being the wheel shaft axis and being located relative to a wheel hub assembly.

An outer gear carrier 64 may be rotatably mounted to the wheel hub assembly, being rotatable relative to the wheel hub assembly about an axis that is both perpendicular to the outer shaft primary axis and perpendicular to a horizontal axis that is perpendicular to the outer shaft primary axis. The shaft outer bevel gear 56 may be located by the outer gear carrier and able to rotate relative to the outer gear carrier about the outer shaft primary axis.

An outer shaft locator 66 may be pivotally connected to the outer gear carrier 64, to pivot about an outer shaft locator pivot axis which passes through the outer rotatable coupling 55 and is both perpendicular to the swinging shaft primary axis and is perpendicular to a horizontal axis perpendicular to the swinging shaft primary axis. The outer end 54 of the swinging shaft 50 may be located by the outer shaft locator 66 and able to rotate relative to the outer shaft locator about the swinging shaft primary axis.

One of the inner shaft, swinging shaft or outer shaft may include first and second shaft portions, the first shaft portion of said shaft being slidably connected to the second shaft portion of said shaft to enable a length of said shaft to vary along the primary axis of said shaft, the first and second shaft portions of said shaft being drivably connected such that rotations of the first and second shaft portions about the primary axis of said shaft are equal.

Preferably, the one of the inner shaft, swinging shaft or outer shaft which may include the first and second shaft portions may be the swinging shaft 50. The first shaft portion 51 of the swinging shaft 50 may be slidably connected by a slidable connection 53 to the second shaft portion 52 of the swinging shaft to enable a total length of the swinging shaft to vary along the primary axis of the swinging shaft. The first and second shaft portions 51, 52 of the swinging shaft may be drivably connected by the slidable connection 53 such that rotation of the first and second shaft portions about the primary axis of the swinging shaft are equal. The swinging shaft first portion 51 may be an inner portion including the inner end 70 of the swinging shaft 50 which may be connected to the inner rotatable coupling 71. The swinging shaft second portion 52 may be an outer portion including the outer end 54 of the swinging shaft 50 which may be connected to the outer rotatable coupling 55.

An inner bevel gear arrangement 79 may include at least the shaft inner bevel gear 72 and the input bevel gear 77. An outer bevel gear arrangement 63 may include at least the shaft outer bevel gear 56 and the output bevel gear 59.

When the shaft outer bevel gear engages indirectly with the output bevel gear on the output shaft, the shaft outer bevel gear 56 may engage with at least one intermediate outer bevel gear 58, 60 in turn engaging with the output bevel gear 61 on the wheel shaft 62. The at least one intermediate outer bevel gear may rotate about an intermediate outer bevel gear axis substantially perpendicular to the output shaft axis. With this arrangement, the outer shaft and the wheel shaft may be aligned. Alternatively, when the shaft outer bevel gear 56 engages directly with the output bevel gear 61 on the wheel shaft 62, the outer shaft and the wheel shaft may be perpendicular, as in FIGS. 21 to 33

According to another aspect of the present invention there is provided an axle assembly for a vehicle, the axle assembly comprising: an input component (72, 73, 166) for receiving rotational power from a motor, the input component mounted such that movement of the input component is constrained relative to a vehicle chassis, subframe or body (21) in three mutually perpendicular linear directions whilst able to rotate about an input component axis; a swinging shaft (50) rotatable about a swinging shaft primary axis; an inner rotatable coupling (71) connected directly or indirectly between the input component and the swinging shaft; an outer bevel gear arrangement (63) including at least a shaft outer bevel gear (56) and an output bevel gear (61), the output bevel gear (61) connected to or engaging directly or indirectly with a wheel shaft (62), the wheel shaft being connectable to a wheel of the vehicle and being constrained relative to a wheel hub assembly in three mutually perpendicular linear directions, whilst able to rotate about a wheel shaft axis; an outer rotatable coupling (55) connected directly or indirectly between the shaft outer bevel gear (56) and the swinging shaft (50); and at least one shaft locator (66) arranged to prevent movement of the swinging shaft (50) in a downward vertical direction relative to the shaft outer bevel gear and the input component; the axle assembly configured such that the axle assembly is extensible and contractable in length; and the outer bevel gear arrangement transferring rotational power from the outer rotatable coupling to the wheel shaft whilst facilitating tilting of the wheel shaft about a tilt axis that is: perpendicular to the axis of rotation of the wheel shaft; and aligned substantially longitudinally of the vehicle during use.

An inner bevel gear arrangement may be provided including at least a shaft inner bevel gear (72) engaging directly or indirectly with an input bevel gear (77) on an input shaft (78); the input component being the shaft inner bevel gear (72) and the input component axis being a shaft inner bevel gear axis; the inner bevel gear arrangement transferring rotational power from the input shaft (78) to the input component connected to the inner rotatable coupling (71) on the swinging shaft, whilst facilitating swinging of the swinging shaft about an inner swinging axis that is perpendicular to the shaft inner bevel gear axis and aligned substantially horizontally relative to the vehicle chassis, subframe or body; and the at least one shaft locator is an outer shaft locator (66) and an inner shaft locator (82).

The shaft inner bevel gear (72) may be connected directly to the inner rotatable coupling (55). Alternatively, the shaft inner bevel gear and the inner rotatable coupling may be connected by an inner shaft (73). Where the inner swinging axis is aligned substantially horizontally relative to the vehicle chassis, subframe or body, the inner swinging axis therefore, in use, tilts with tilt of the vehicle to remain horizontal relative to the vehicle chassis, subframe or body.

The axle assembly may include an outer gear carrier (64) rotatably mounted to the wheel hub assembly, being rotatable relative to the wheel hub assembly about an axis that is both perpendicular to a shaft outer bevel gear primary axis and perpendicular to a horizontal axis that is perpendicular to the shaft outer bevel gear primary axis. The shaft outer bevel gear (56) may be located by the outer gear carrier (64) and able to rotate relative to the outer gear carrier about a shaft outer bevel gear primary axis. The outer shaft locator (66) being pivotally connected to the outer gear carrier (64), to pivot about an outer shaft locator pivot axis which passes through the outer rotatable coupling and is both perpendicular to the swinging shaft primary axis and is perpendicular to a vehicle horizontal axis perpendicular to the swinging shaft primary axis; an outer end of the swinging shaft being located by the outer shaft locator and able to rotate relative to the outer shaft locator about the swinging shaft primary axis. An inner gear carrier (80) may be rotatably mounted relative to the vehicle chassis, subframe or body about an axis that is both perpendicular to the shaft inner bevel gear primary axis and perpendicular to a vehicle horizontal axis perpendicular to the shaft inner bevel gear primary axis; the shaft inner bevel gear (72) being located by the inner gear carrier (80) and able to rotate relative to the inner gear carrier about the shaft inner bevel gear primary axis; the inner shaft locator (82) being pivotally connected to the inner gear carrier (80), to pivot about an inner shaft locator pivot which passes through the inner rotatable coupling and is both perpendicular to the swinging shaft primary axis and is perpendicular to a vehicle horizontal axis perpendicular to the swinging shaft primary axis. For clarity, each vehicle horizontal axis is an axis that remains horizontal relative to the vehicle as the vehicle tilts.

The outer bevel gear arrangement may include at least one intermediate bevel gear (58, 60), the at least one intermediate bevel gear being rotatable about an intermediate bevel gear primary axis; the intermediate bevel gear primary axis being perpendicular to the shaft outer bevel gear primary axis and perpendicular to a primary axis of the output bevel gear; the at least one intermediate bevel gear (58, 60) being driven by the shaft outer bevel gear (56) and driving the output bevel gear (61). For example, the outer shaft (57) and the wheel shaft (62) may be parallel.

Alternatively, in the outer bevel gear arrangement (63), the shaft outer bevel gear may directly engage the output bevel gear; a shaft outer bevel gear primary axis being perpendicular to an output bevel gear primary axis. For example, the outer shaft (57) may be perpendicular to the wheel shaft (62).

The motor may be located by or fixed to a main bridge that is connected directly or indirectly between the vehicle chassis, subframe or body and the wheel hub assembly; the input component may be a shaft inner gear (166); the at least one shaft locator may be an outer shaft locator (66).

The axle assembly may include an outer gear carrier (64) rotatably mounted to the wheel hub assembly, being rotatable relative to the wheel hub assembly about an axis that is both perpendicular to a shaft outer bevel gear primary axis and perpendicular to a horizontal axis that is perpendicular to the shaft outer bevel gear primary axis; the shaft outer bevel gear (56) being located by the outer gear carrier (64) and able to rotate relative to the outer gear carrier about a shaft outer bevel gear primary axis; the outer shaft locator (66) being pivotally connected to the outer gear carrier (64), to pivot about an outer shaft locator pivot axis which passes through the outer rotatable coupling and is both perpendicular to the swinging shaft primary axis and is perpendicular to a horizontal axis perpendicular to the swinging shaft primary axis; an outer end of the swinging shaft being located by the outer shaft locator and able to rotate relative to the outer shaft locator about the swinging shaft primary axis.

The axle assembly may be extensible and contractable in length within the swinging shaft (50) which comprises a swinging shaft first portion (51) connected to the inner rotatable coupling and a swinging shaft second portion (52) connected to the outer rotatable coupling; the swinging shaft first portion (51) being slidably connected to the swinging shaft second portion (52) by a slidable connection (53) to enable a total length of the swinging shaft (5) to vary along the swinging shaft primary axis; the swinging shaft first portion and the swinging shaft second portion being drivably connected by the slidable connection such that rotation of the first and second shaft portions about the primary axis of the swinging shaft are equal.

A ball spline between the swinging shaft first and second portions (51, 52) to provide the slidable connection (53) and to provide the drivable connection.

The outer rotatable coupling (55) and/or the inner rotatable coupling (71) may be a form of universal joint or constant velocity joint.

Another aspect of the invention may provide a vehicle comprising an axle assembly, wherein during use the swinging shaft 50 rotates through an angle of at least forty degrees through a combination of full tilt angle of a body and of wheels of the tilting vehicle and/or full suspension travel from suspension full compression to suspension full extension.

Another aspect of the invention may provide a vehicle comprising an axle assembly and independent suspension where the swinging shaft 50 swings through an angle of at least forty degrees through full suspension travel from suspension full compression to suspension full extension.

Another aspect of the of the present invention may provide back suspension arrangement for a tilting vehicle having at least one axle assembly, the back suspension arrangement (20) including at least a back left wheel (23) and a back right wheel (24); one said axle assembly may be a back left axle assembly (41) provided for the back left wheel and another said axle assembly may be a back right axle assembly (42) provided for the back right wheel; the respective back left and back right wheels (23, 24) being connected to a respective wheel hub assembly (25, 26), each slidably mounted on a respective suspension upright (27, 28); the back left suspension upright (27) being pivotally or rotatably connected to the back right suspension upright (28) by at least a main bridge (33); the main bridge being pivotally connected to a body of the tilting vehicle, at least one additional suspension geometry link (34) pivotally connected between the body and the back left and/or back right suspension upright; the back left and back right wheels, the respective hub assemblies, respective suspension uprights, the main bridge and the at least one additional suspension geometry link together forming at least a portion of a back suspension arrangement for the tilting vehicle.

The motor may be a back left wheel motor (43) for the back left axle assembly (41) and a back right wheel motor (44) for the back right axle assembly (42). Alternatively, the motor may be a single motor from which the input components of the back left and back right axle assemblies receive rotational power.

According to another aspect of the invention, there is provided an axle assembly for transferring rotational power from an input component of the axle assembly to an output shaft of the axle assembly; the input component for receiving rotational power from a power source, and the input component mounted such that movement of the input component is constrained relative to a main chassis, subframe or fabric of a body in three mutually perpendicular linear directions whilst able to rotate about an input axis; the output shaft mounted such that movement of the output shaft is constrained in three mutually perpendicular linear directions whilst able to rotate about an output shaft axis; the axle assembly further comprising: a swinging shaft rotatable about a longitudinal swinging shaft axis; an inner rotatable coupling connected between the input component and the swinging shaft; an outer rotatable coupling connected between the output shaft and the swinging shaft; and at least one shaft locator arranged to prevent movement of the swinging shaft in a downward vertical direction; and the axle assembly configured such that the axle assembly is longitudinally extensible and contractable; and the axle assembly comprising a bevel gear arrangement connected to the outer rotatable coupling, the bevel gear arrangement transferring rotational power from the swinging shaft to the output shaft whilst facilitating tilting of the output shaft about a tilt axis that is: perpendicular to the axis of rotation of the outer shaft; and aligned longitudinally of the body during use.

BRIEF DESCRIPTION OF DRAWINGS

In the drawings:

FIG. 5 is the perspective view of the arrangement of FIG. 4 with the motors, subframe and suspension uprights omitted.

DESCRIPTION OF PREFERRED EMBODIMENT

Figures 1, 2, 3, 4:
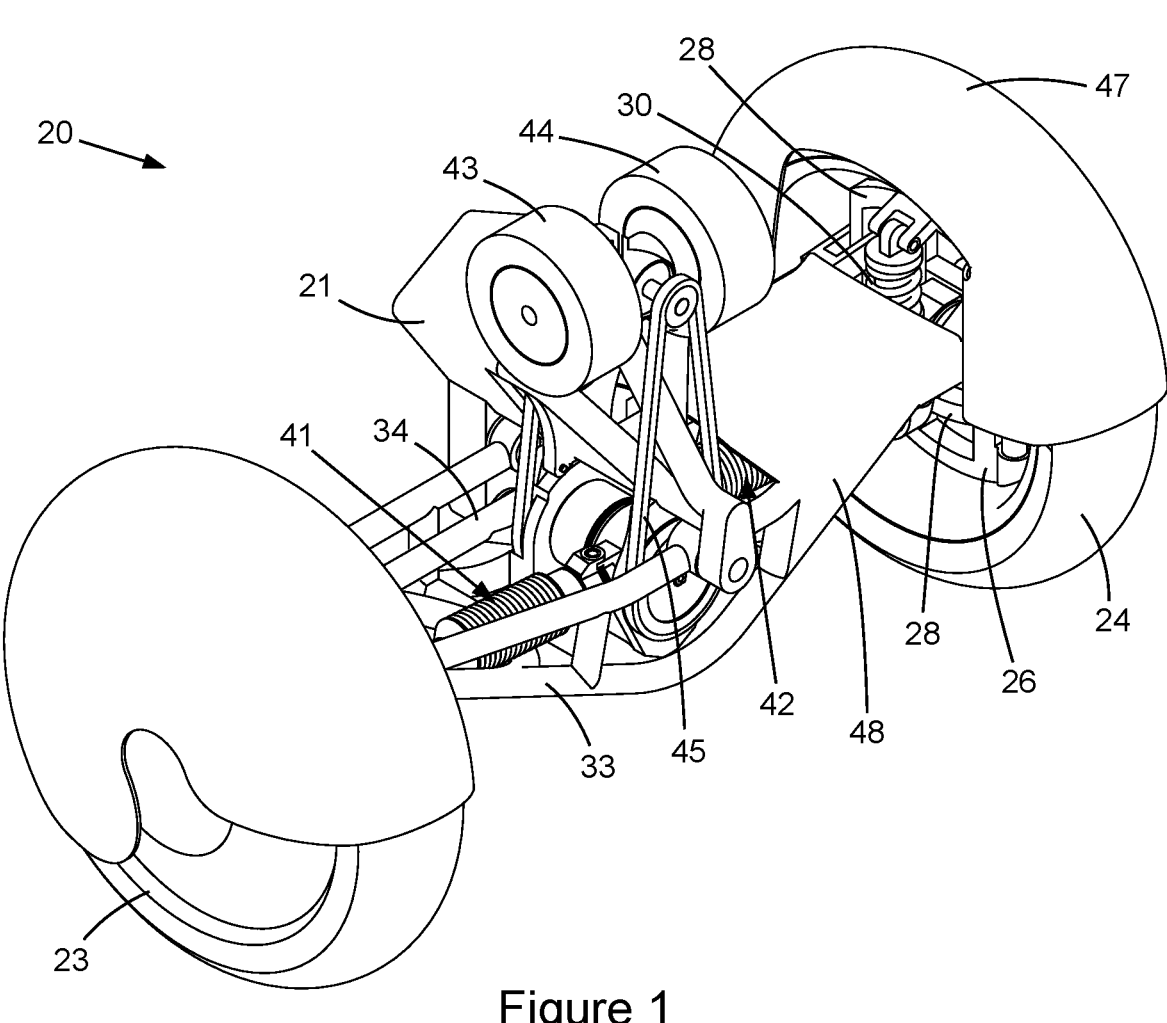
FIG. 1 is a perspective view of a back suspension arrangement according to the present invention.
FIG. 2 is a perspective view of the additional bridge of the suspension arrangement of FIG. 1.
FIG. 3 is a perspective view of the main bridge of the suspension arrangement of FIG. 1.
FIG. 4 is a perspective view of the main and additional bridges of the suspension arrangement of FIG. 1.

In the present specification, the term 'motor' will be understood to mean any device capable of providing rotational power, such as an internal combustion engine or an electric motor.

Throughout the description, like or equivalent components or features are allocated the same reference numeral.

Referring initially to FIG. 1 there is shown a back suspension arrangement 20 for a tilting vehicle (not shown). The view is taken from the rear of the back suspension arrangement. An optional back subframe 21 is preferably used to assemble the back suspension arrangement to the body or chassis of the vehicle and potentially to help isolate the body from suspension noise, vibration and harshness.

The back suspension arrangement includes a back left wheel 23 and a back right wheel 24, each carried on a wheel hub assembly such as the back right wheel hub assembly 26 of the back right wheel 24. Each back right wheel hub assembly slides on a respective suspension upright, such as the back right suspension upright 28. The back left and back right suspension uprights are pivotally mounted to two bridges 33, 34 which are pivoted to the body or subframe 21.

The main bridge 33 is shown in FIG. 3 with the pivots 35 to the suspension uprights and the pivots 37 to the body or subframe being visible. The right-hand side of the main bridge 33 is shown with suspension guard or cover plates 48, which are omitted on the left-hand side to expose more detail for the purposes of description and clarity only. The additional bridge 34 (which can be the secondary bridge shown, or two individual suspension geometry links, one for each suspension upright) is shown in FIG. 2. The additional bridge 34 has pivots 36 to the suspension uprights and a pivot 38 to the body or subframe. FIG. 4 shows the two bridges in the relative positions when in use.

Figures 5, 6:
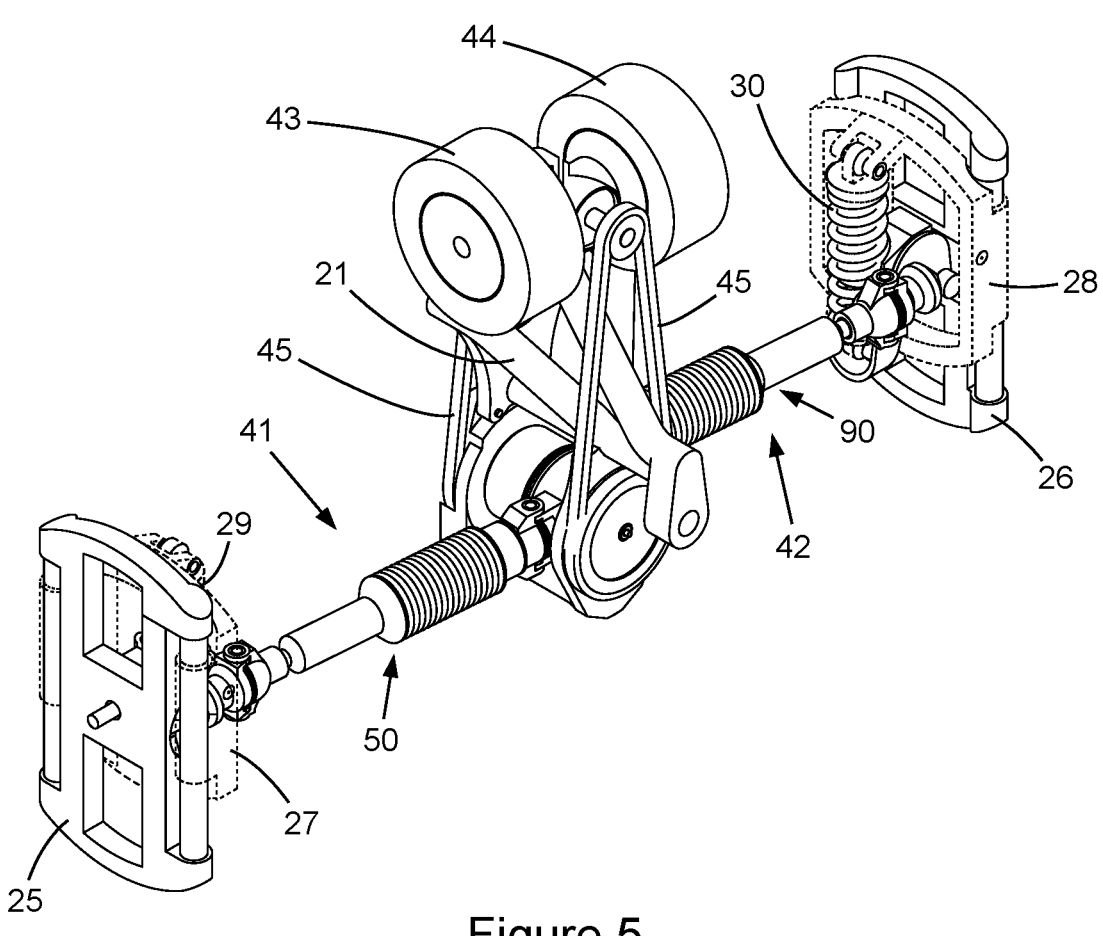
FIG. 5 is a perspective view of the motors, subframe, axle assemblies, hub assemblies and suspension uprights of the suspension arrangement of FIG. 1.
FIG. 6 is a perspective view of the shafts and gears within the axle assemblies shown in FIG. 5.

Referring now to FIG. 1 and to FIG. 5, as the back left and back right wheels vary in vertical load, the suspension extends and compresses by the sliding of the back left and back right wheel hub assemblies 25, 26 on the respective back left or back right suspension upright 27, 28, compressing or extending the back left and back right suspension springs 29, 30. This type of sliding arrangement is disclosed in the applicant's prior U.S. Pat. No. 11,370,262, details of which are incorporated herein by reference.

The back left and back right axle assemblies 41, 42 are driven in FIG. 5 by respective back left and back right motors 43, 44 which drive belts 45 to turn input shaft pulleys. The back left and back right axle assemblies are more visible in FIG. 5 than in FIG. 1, although in FIG. 5 the gears and portions of the shafts of the axle assemblies are not visible, being enclosed in various housings.

These shafts and gears running inside casings of the back left and back right axle assemblies are shown in FIG. 6. The back left input shaft 78 is driven by a motor as discussed above and includes an input bevel gear 77 which engages with a shaft inner bevel gear 72 on the inner shaft 73 at the inner end (i.e. the end towards the centre of the arrangement) of the back left axle shaft portions. The shaft inner bevel gear 72 and the input bevel gear 77 form at least part of an inner bevel gear arrangement 79. The back left axle shaft portions include a swinging shaft 50, an outer shaft 57 and the inner shaft 73. The back left axle needs to be able to vary in total length to accommodate the required motions during use, so one of the swinging shaft 50, outer shaft 57 or inner shaft 73 must be variable in length. In FIG. 6, the back left swinging shaft 50 comprises a first portion 51 (located towards the centre of the back suspension arrangement) and a second portion 52 (located towards a left side of the back suspension arrangement). The swinging shaft first portion 51 is slidably connected to the swinging shaft second portion 52 so that the axle can vary in length, but transmit torque.

The shaft inner bevel gear 72 on the inner shaft 73 is connected to the inner end 70 of the swinging shaft 50 (i.e. the inner end of the back left swinging shaft first portion 51) by an inner rotatable coupling 71 such as a universal joint or CV joint. The shaft outer bevel gear 56 on the outer shaft 57 is connected to the outer end 54 of the swinging shaft (i.e. the outer end of the back left swinging shaft second portion 52) by an outer rotatable coupling 55. The shaft outer bevel gear 56 engages with a first intermediate bevel gear 58 on a common shaft with a second or optional additional intermediate bevel gear 60 which engages with the output bevel gear 61 on the wheel shaft 62. The shaft outer bevel gear 56 and the output bevel gear 61 form at least part of an outer bevel gear arrangement 63. In this case, where the wheel shaft 62 and the outer shaft 57 are parallel, the outer bevel gear arrangement 63 also includes the intermediate bevel gears 58, 60.

Similarly, the back right input shaft 118 is driven directly or indirectly by a motor. Fixed to, integral with or mounted on the back right input shaft 118 is the input bevel gear 117 which engages with a shaft inner bevel gear 112 on the inner shaft 113 at the inner end (i.e. the end towards the centre of the arrangement) of the back right axle shaft portions. The shaft inner bevel gear 112 and the input bevel gear 117 form at least part of an inner bevel gear arrangement 119. The back right axle shaft portions include a swinging shaft 90, an outer shaft 97 and the inner shaft 113. The back right axle needs to be able to vary in total length to accommodate the required motions during use, so one of the swinging shaft 90, outer shaft 97 or inner shaft 113 must be variable in length. In FIG. 6, the back right swinging shaft 90 comprises a first portion 91 (located towards the centre of the back suspension arrangement) and a second portion 92 and a second portion 52 (located towards a right side of the back suspension arrangement). The swinging shaft first portion 51 is slidably connected to the swinging shaft second portion 52 so that the axle can vary in length, but transmit torque.

The shaft inner bevel gear 112 on the inner shaft 113 is connected to the inner end 110 of the swinging shaft 90 (i.e. the inner end of the back right swinging shaft first portion 91) by the inner rotatable coupling 111. The shaft outer bevel gear 96 on the outer shaft 97 is connected to the outer end 94 of the swinging shaft (i.e. the outer end of the back right swinging shaft second portion 92) by an outer rotatable coupling 95. The shaft outer bevel gear 96 engages with a first intermediate bevel gear 98 on a common shaft with a second or optional additional intermediate bevel gear 100 which engages with the output bevel gear 101 on the wheel shaft 102. The shaft outer bevel gear 96 and the output bevel gear 101 form at least part of an outer bevel gear arrangement 103. In this case, where the wheel shaft 102 and the outer shaft 97 are parallel, the outer bevel gear arrangement 103 also includes the intermediate bevel gears 98, 100.

Figure 7:
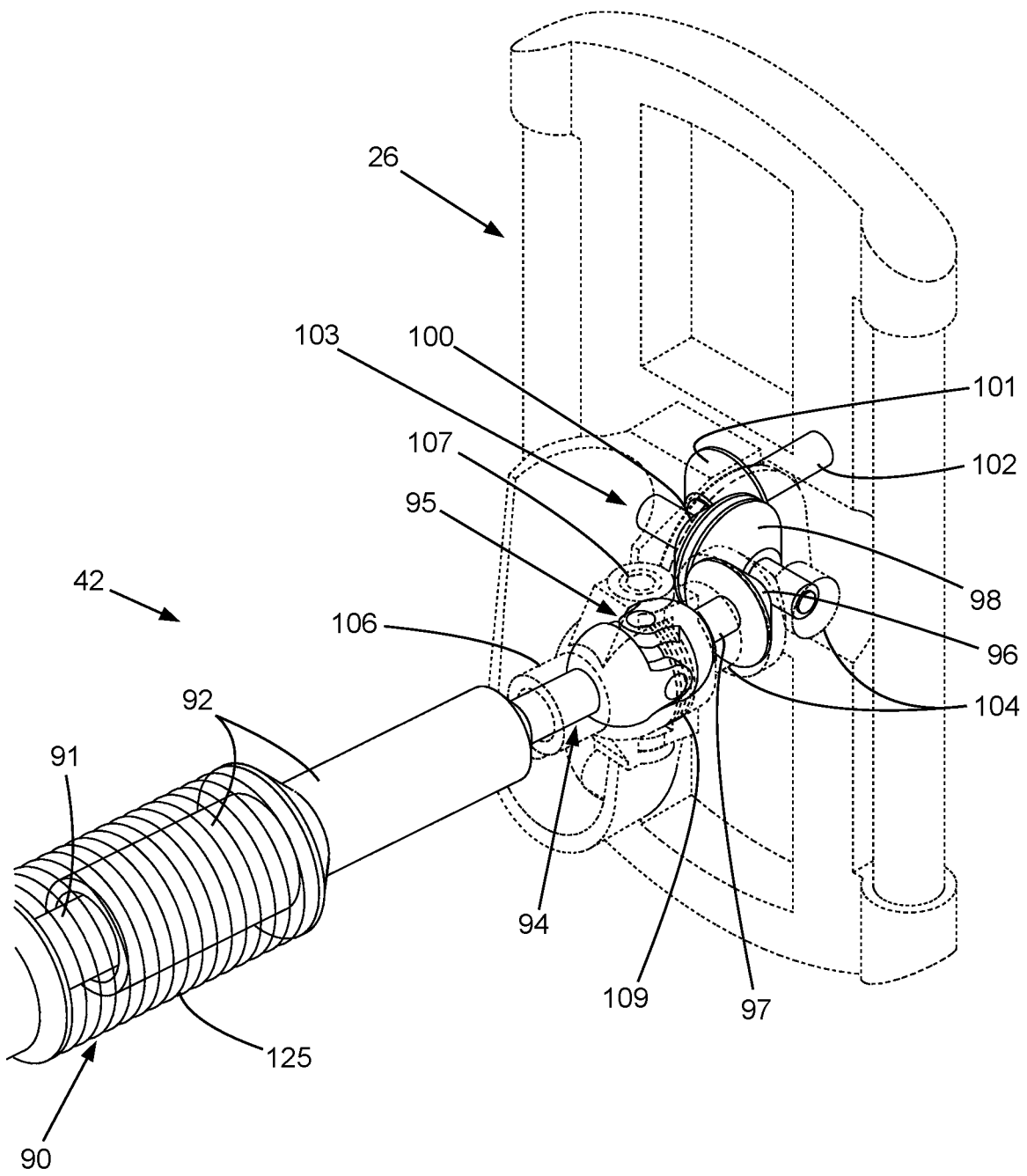
FIG. 7 is a perspective partial hidden line view of the right wheel hub end of an axle assembly of FIG. 1 and FIG. 5 showing shafts and gears from FIG. 6.

FIG. 7 shows the back right axle assembly 42 at the back right wheel hub assembly with the shafts and gears shown in continuous lines and the back right wheel hub assembly 26 and the axle housing components shown in dashed lines, to indicate the relative location of the various elements. The back right wheel shaft 102 rotates inside and is radially and axially located by the wheel hub assembly 26. The intermediate bevel gears 100, 98 are radially and axially located at one end by the wheel hub assembly 26 and at the opposite end by the outer gear carrier 104, which also locates the shaft outer bevel gear 96 and the outer shaft 97. The outer gear carrier 104 can rotate relative to the wheel hub assembly 26 about a primary axis through the intermediate bevel gears 98, 100. The outer bevel gear arrangement thereby transmits torque between the outer shaft 97 (connected by the outer rotatable coupling 95 to the swinging shaft 90) and the wheel shaft 102 while allowing large rotational swing displacements (about the primary axis through the intermediate bevel gears 98, 100) of the wheel hub assembly 26 relative to the swinging shaft 90.

The bevel gears 96, 98, 100, 101 of the outer bevel gear arrangement 103 provide a constant gear ratio between the shaft outer bevel gear 96 and the output bevel gear 101, throughout all possible angles of the rotation of the outer gear carrier 104 about the primary axis through the intermediate bevel gears 98, 100. The friction through the bevel gears is also unaffected by the rotation angle of the outer gear carrier 104. It therefore provides a constant velocity type function, but without any variation in friction. The provides a constant torque transmission of axle rotation regardless of the size of the articulation angle (angle of rotation) of the outer gear carrier 104, unlike a CV joint which has varying friction which increases significantly with articulation angle of the CV joint.

The outer rotational coupling 95 is provided to accommodate any misalignment between the swinging shaft 90 (having the first and second portions 91, 92) and outer shaft 97 with the shaft outer bevel gear 96 which is located by the outer gear carrier 104. For example, for absorption of noise and harshness, fore-aft compliance can be provided between the body where the motor can be mounted and the wheel hub assemblies, to which the wheels are mounted. To prevent such compliance from generating problems through misalignment, the rotatable coupling 95 is provided. The outer gear carrier 104 and outer shaft locator 106 can enclose the gears within and can contain lubrication. The bellows 109 are provided to seal the varying gap between surfaces of the outer gear carrier 104 and outer shaft locator 106.

To support the outer end 94 of the swinging shaft second portion 92 the outer shaft locator is pivotally connected to the outer gear carrier 104 at pivot 107 which is oriented in this example substantially vertically and passing through the centre of the outer rotatable coupling 95. The back right swinging shaft first portion 91 is visible through the bellows 125 and slides inside the back right swinging shaft second portion 92. The bellows can be vented to prevent large changes in pressure inside the bellows with relative extension and contraction of the axle shaft portions 91, 92.

Figure 8:
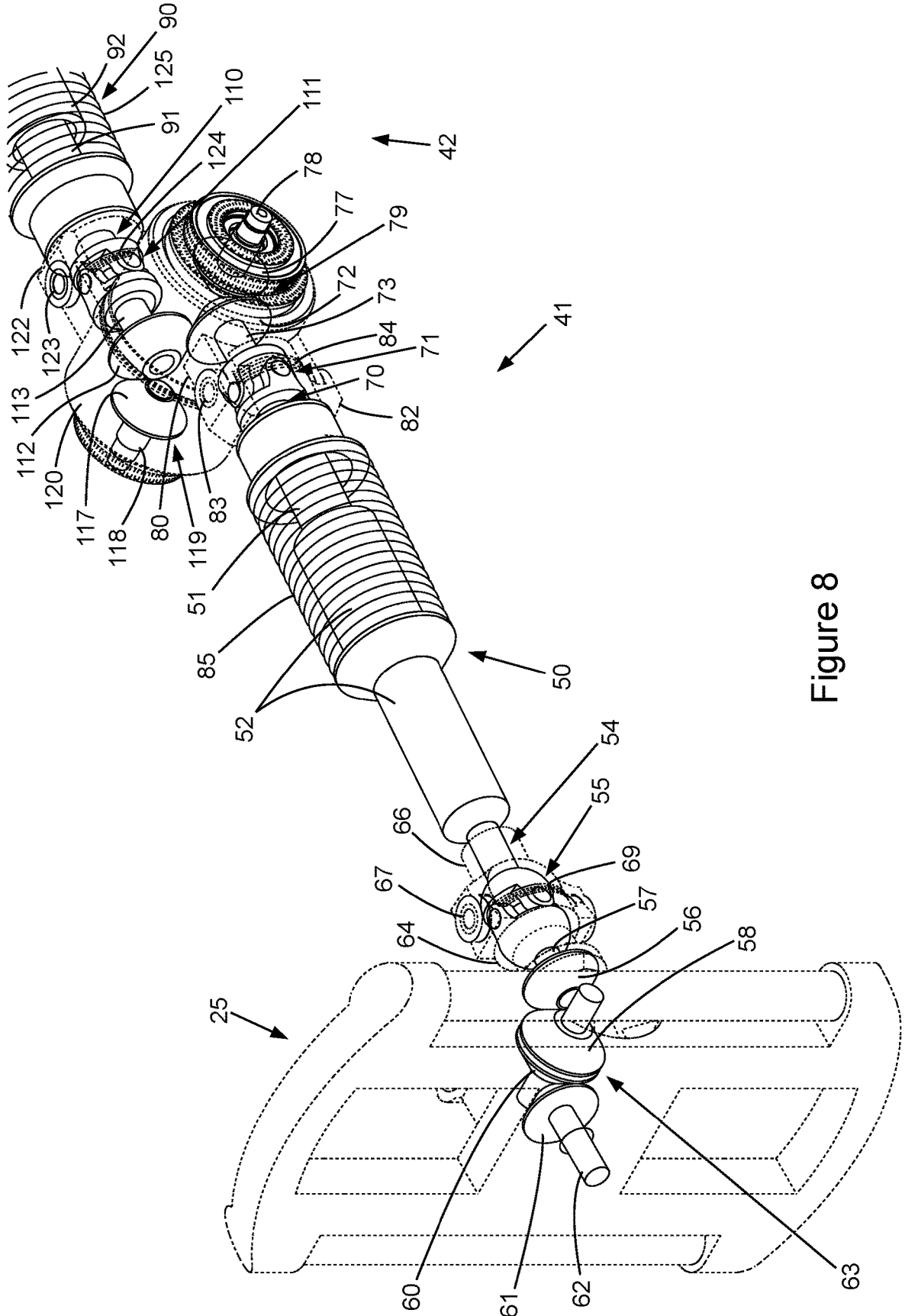
FIG. 8 is a perspective partial hidden line view of the left wheel hub end and input gearing arrangement of an axle assembly of FIG. 1 and FIG. 5 showing shafts and gears from FIG. 6.

FIG. 8 shows the central and left portions of the back axle assemblies 41, 42. The back left wheel hub assembly 25 is shown in dashed lines with the gears and shafts visible within. Similarly the inner ends 70, 110 of the back left and back right swinging shaft first portions 51, 91 with the rotatable couplings and bevel gears are visible inside the back left inner gear carrier 80 pivoted by pivot 83 to the inner shaft locator 82 and inside the back right inner gear carrier 120 pivoted by pivot 123 to the inner shaft locator 122. Bellows 84 and 124 are provided between the respective back left or back right inner gear carrier 80, 120 and the respective back left or back right inner shaft locator 82, 122.

The inner bevel gear arrangement 119 on the right axle assembly is located within the back right inner gear carrier 120 and includes the shaft inner bevel gear 112 (located on the inner shaft 113) and the input bevel gear 117 (located on the input shaft 118). The inner bevel gear arrangement 79 on the left axle assembly is located within the back left inner gear carrier 80 and includes the shaft inner bevel gear 72 (located on the inner shaft 73) and the input bevel gear 77 (located on the input shaft 78).

The back left and back right inner gear carriers 80, 120 are rotatable relative to each other and the vehicle chassis, subframe or body about a primary axis through the input bevel gears 77,117 and the input shafts 78, 118. The right inner bevel gear arrangement 119 transmits torque between the input shaft 118 and the inner shaft 113 (connected by the inner rotatable coupling 111 to the swinging shaft 90), while together with the back right inner gear carrier 120 allowing large rotational swing displacements (about the primary axis through the input bevel gear 117) of the swinging shaft 90 relative to the vehicle chassis, subframe or body. The left inner bevel gear arrangement 79 transmits torque between the input shaft 78 and the inner shaft 73 (connected by the inner rotatable coupling 71 to the swinging shaft 50), while together with the back left inner gear carrier 80 allowing large rotational swing displacements (about the primary axis through the input bevel gear 77) of the swinging shaft 90 relative to the vehicle chassis, subframe or body.

The inner end 110 of the back right swinging shaft first portion 91 is supported by the inner shaft locator 122 which is pivotally connected about a pivot 122 (having a pivot axis) to the back right inner gear carrier 120. The pivot axis is both perpendicular to the primary axis through the swinging shaft 90 and perpendicular to a virtual axis, the virtual axis being located in a plane that remains horizontal relative the vehicle body and being perpendicular to the primary axis through the swinging shaft 90. Similarly, the inner end 70 of the back left swinging shaft first portion 51 is supported by the inner shaft locator 82 which is pivotally connected about a pivot 83 (having a pivot axis) to the back left inner gear carrier 80. The pivot axis is both perpendicular to the primary axis through the swinging shaft 50 and perpendicular to a virtual axis, the virtual axis being located in a plane that remains horizontal relative the vehicle body and being perpendicular to the primary axis through the swinging shaft 50.

The outer end 54 of the back left swinging axle shaft second portion 52 is supported by the outer shaft locator 66 which is pivoted at pivot 67 to the outer gear carrier 64, with bellows 69 therebetween. The pivot 67 has a pivot axis that is both perpendicular to the primary axis through the swinging shaft 50 and perpendicular to a virtual axis, the virtual axis being located in a plane that remains horizontal relative the wheel hub assembly 25 and being perpendicular to the primary axis through the swinging shaft 50. The outer gear carrier 64 is rotatable relative to the wheel hub assembly 25 about the primary axis of the intermediate bevel gears 58, 60. The outer bevel gear arrangement 63 includes the shaft outer bevel gear 56 and the output bevel gear 61 and in this example, also includes the intermediate bevel gears 58, 60.

Figure 9:
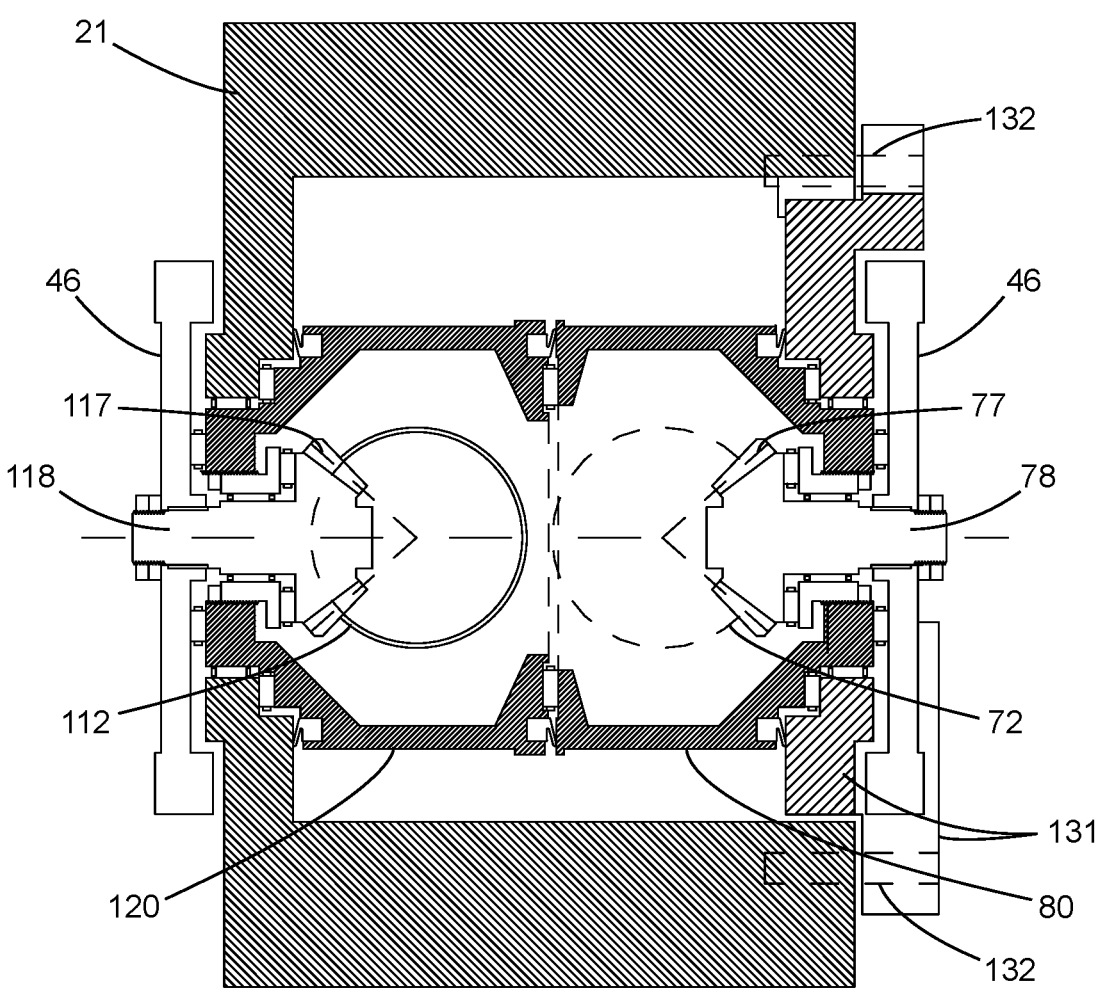
FIG. 9 is a sectional view through the inner gear carriers and inner bevel gears of the back suspension arrangement shown in FIGS. 1, 5 and 8.

FIG. 9 shows the back left and back right inner gear carriers 80, 120 in cross-section. Each inner gear carrier 80, 120 can rotate relative to the subframe 21 (or the vehicle body). Bearings are provided between the inner gear carriers and between each inner carrier and the subframe 21 or the plate 131 which is bolted to the subframe by bolts 132 to axially locate the inner gear carriers 80, 120 relative to the subframe 21. The input shaft pulleys 46 from the left and right motor belt drives can be seen fixed to the back left and back right input shafts 78, 118.

Figure 10:
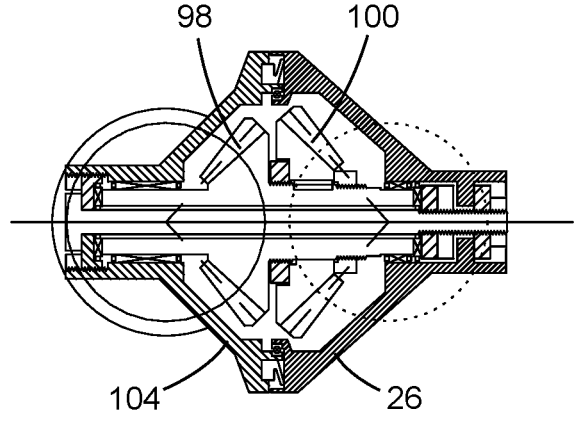
FIG. 10 is a sectional view through an outer gear carrier of the back suspension arrangement of FIG. 1.

FIG. 10 shows the outer gear carrier in a section along the common shaft between the intermediate bevel gears 98, 100. The seal of the rotation between the outer gear carrier 104 and the wheel hub assembly 26 is shown as a lip seal.

Figure 11:
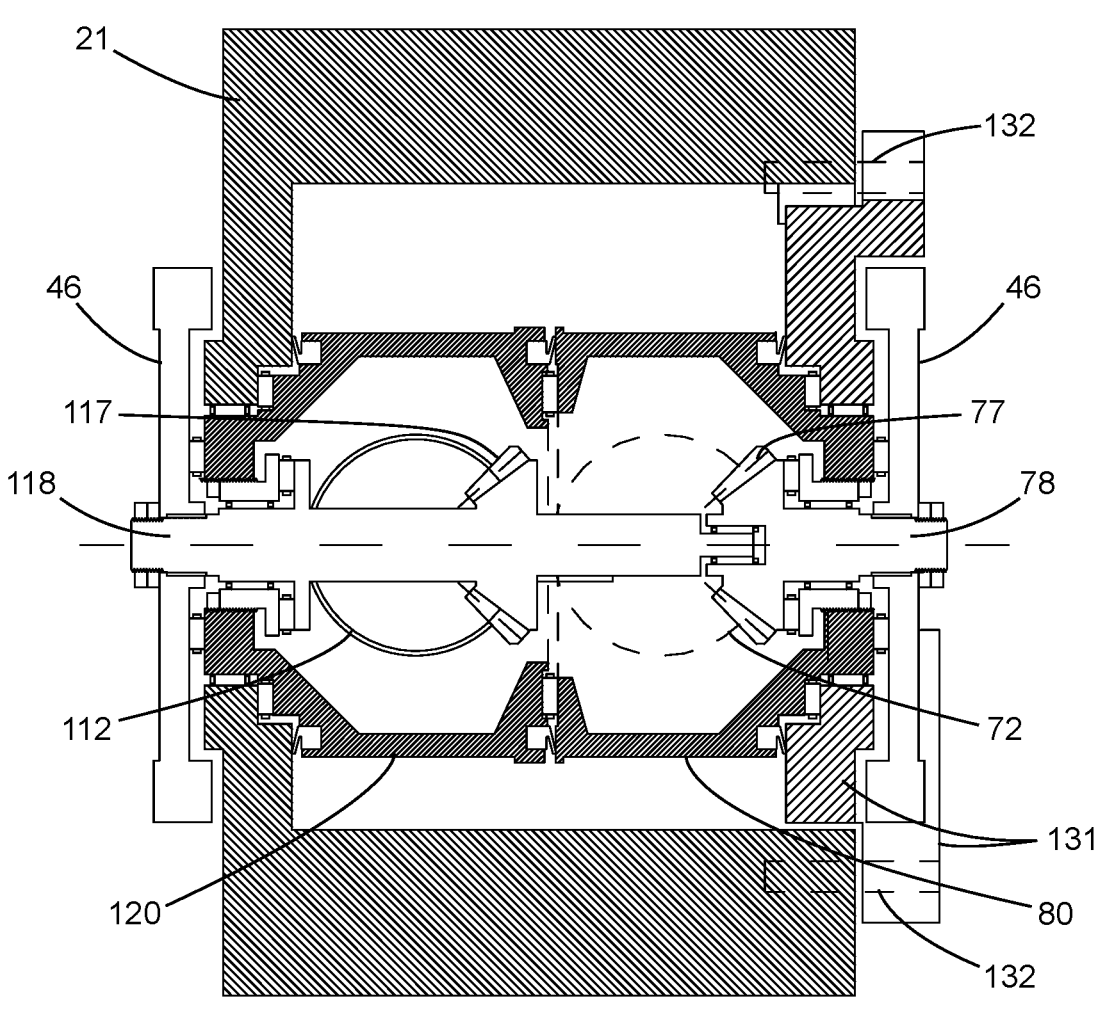
FIG. 11 is a sectional view through an inner gear carrier and bevel gear arrangement similar to FIG. 9 but for motors where one primary spin direction is reversed.
Figure 12:
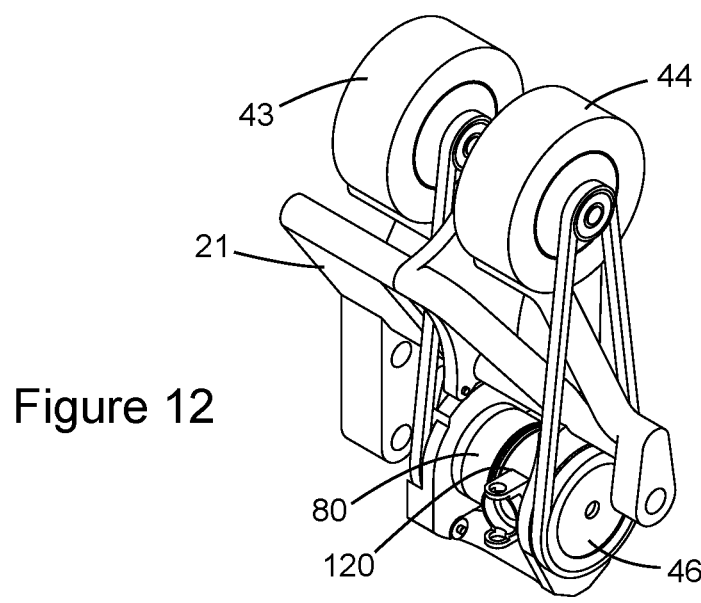
FIG. 12 is a perspective view of an alternative arrangement of motors for the back suspension arrangement of the present invention.

FIG. 11 shows a variation on the arrangement of the input bevel gears 77, 117 in the inner gear carriers 80, 120 previously shown in FIG. 9 by reversing the orientation of one of the input bevel gears 117 on its input shaft 118. This can provide for different directions of motor rotation which can be desirable if, for example, motors are oriented to spin in opposite directions with forward motion, the opposing directions of spin reducing any effects of rotational inertia changes from the motors on the roll rotation of the body of the vehicle. FIG. 12 shows such a motor arrangement, with the back left and back right motors 43, 44 oriented with their spin axes longitudinally.

Figure 13:
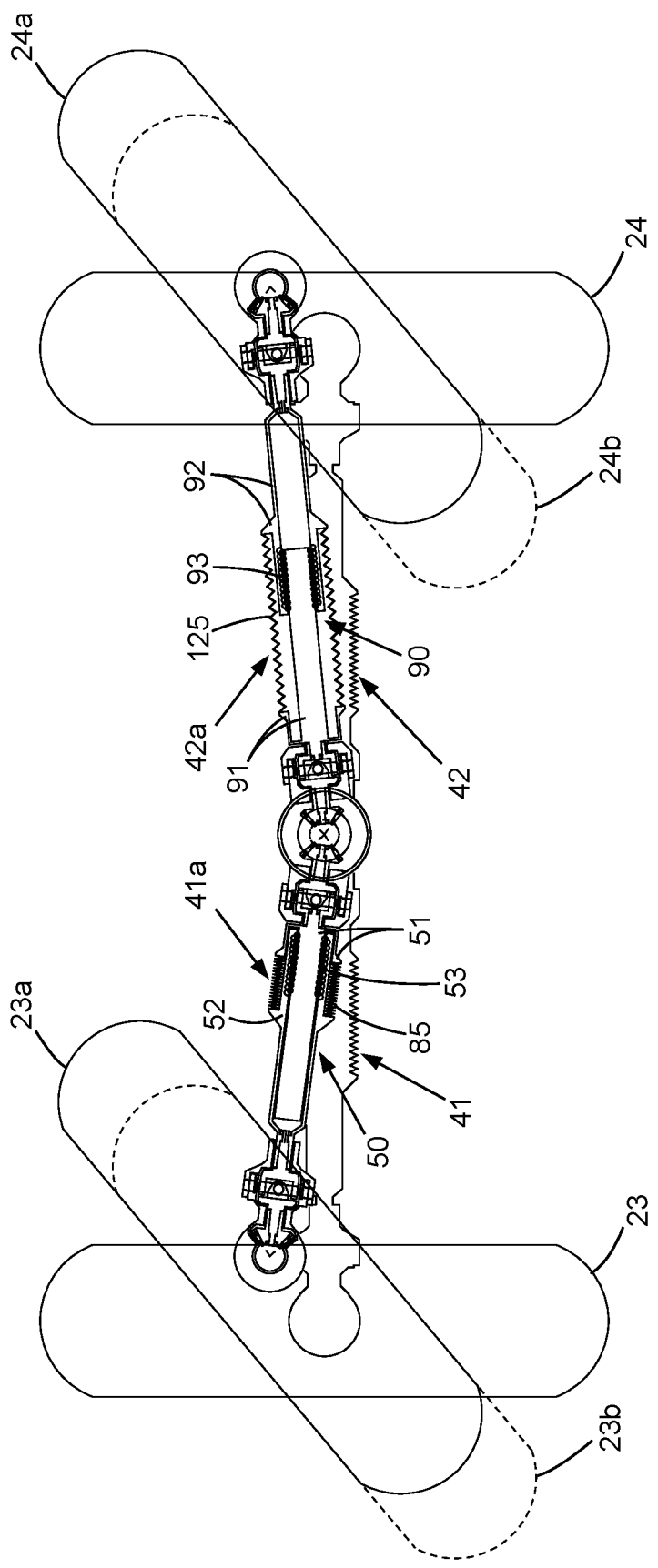
FIG. 13 is a schematic view through the back axle assemblies when in centre position at ride height and when tilted with suspension compressed.

In FIG. 13 the back left and back right wheels 23, 24 are shown in a vertical orientation, without an outline of the back left and back right axle assemblies 41, 42. A tilted orientation is also indicated by dashed lines for tilted back left and back right wheels 23b, 24b. The tilted wheels 23b, 24 are also shown fully compressed using the wheel suspension between the wheel hub carriers and the wheel hub assemblies (not shown). As can be seen from the sections of the tilted back left and back right axle assemblies 41a, 42a, such a large tilt of the wheels to the right can induce a full contraction of the back left swinging shaft 50 (comprising the first and second portions 51, 52) and a maximum extension of the back right swinging shaft 90 (comprising the first and second portions 91, 92).

The sliding connections between the swinging shaft first and second portions 51, 52 or 91, 92 are shown as ball splines. These forms of sliding connection are preferred as they are able to transmit axle torque and at the same time allow contraction or extension of the swinging shaft with acceptably low friction. If the sliding friction were high, especially when the axle portions were transmitting significant torque, sliding of the axle portions could be hindered which would result in forces working against the tilting of the vehicle. In a passive, balancing control vehicle, such forces could be debilitating.

Figure 14:
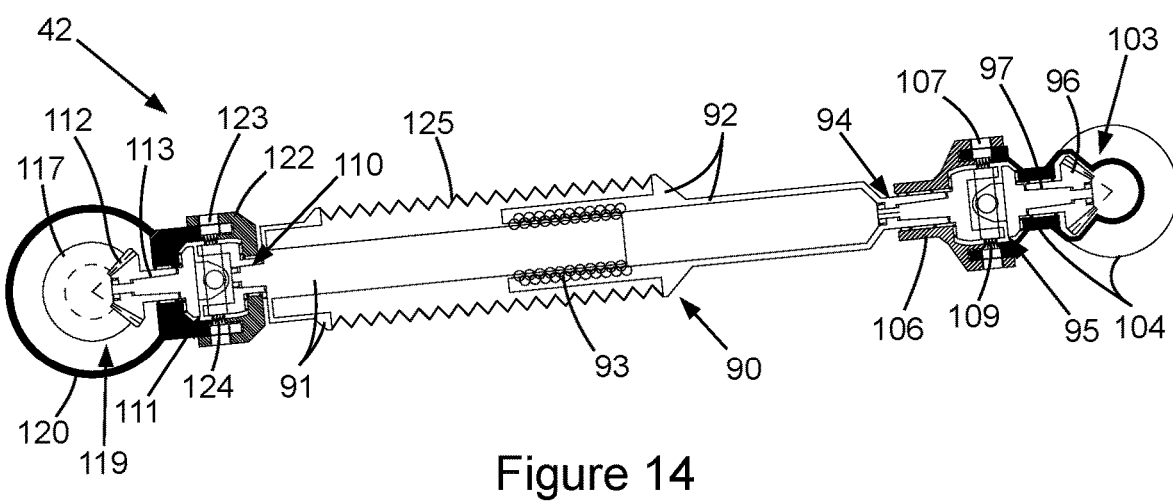
FIG. 14 is a sectional view through the back right axle assembly with the first and second portions of the swinging shaft in a fully extended position.
Figure 15:
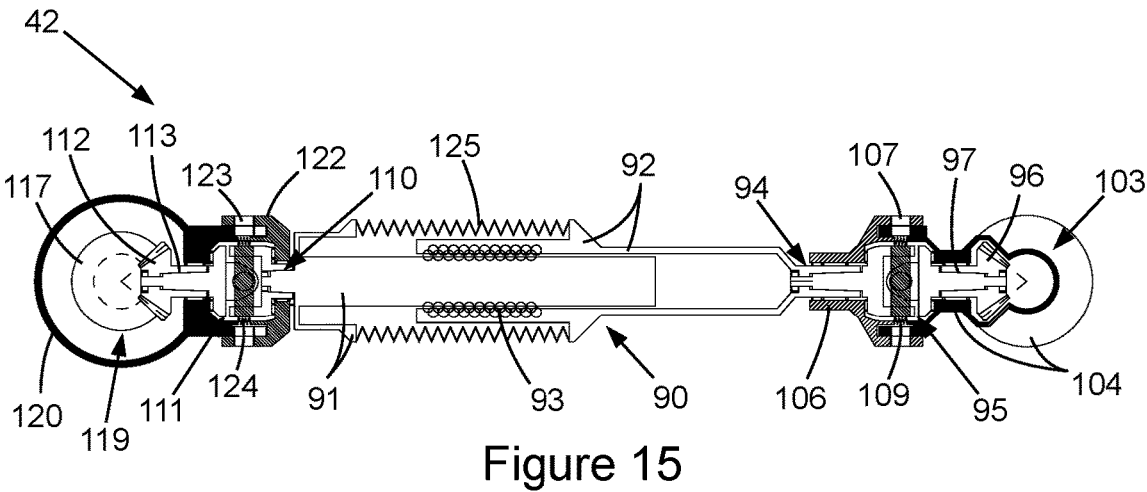
FIG. 15 is a sectional view through the back right axle assembly with the first and second portions of the swinging shaft in a standard or central position.
Figure 16:
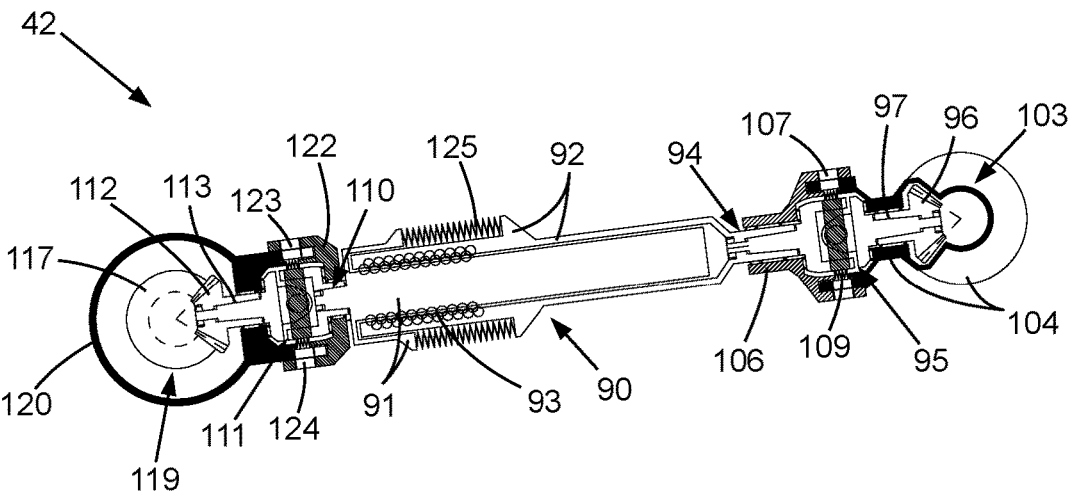
FIG. 16 is a sectional view through the back right axle assembly with the first and second portions of the swinging shaft in a fully contracted position.

FIG. 14 shows a cross-section through the back right axle assembly 42 in an extended position of the sliding connection. FIG. 15 shows a cross-section through the back right axle assembly 42 in neutral position, for example at ride height and no tilt angle. FIG. 16 shows a cross-section through the back right axle assembly 42 in a contracted position of the sliding connection.

Figures 17, 18, 19:
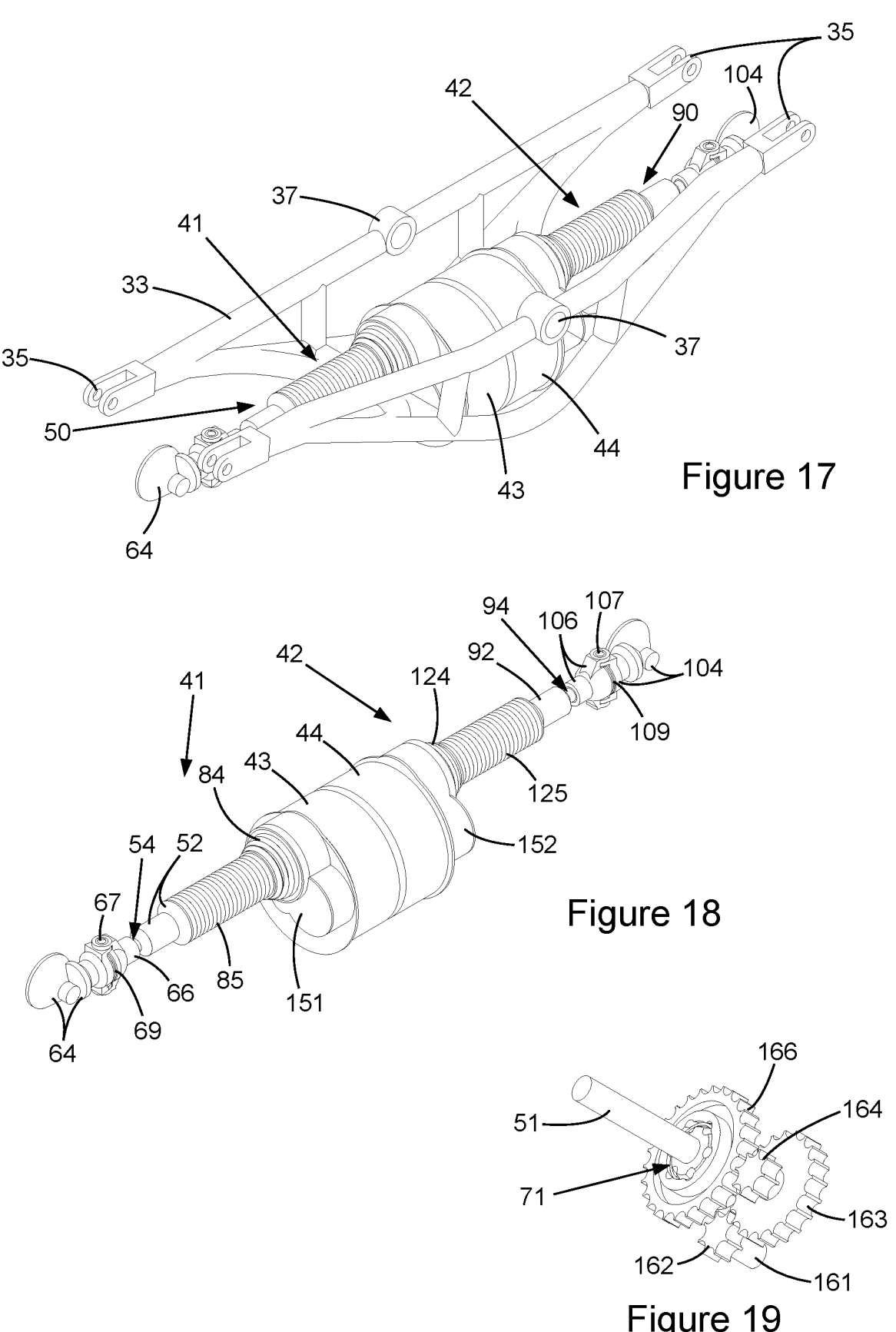
FIG. 17 is a perspective view of a back axle arrangement with the motors mounted in the main bridge.
FIG. 18 is a perspective view of the back axle assemblies of FIG. 17.
FIG. 19 is a perspective view of the gears inside a gearbox of the back axle assemblies of FIG. 18.

A further alternative motor location in shown in FIG. 17 where the back left and back right motors 43, 44 are shown mounted in the main bridge 33. This can provide multiple benefits such as packing of the motors and reduction in the angle required at the inner ends of the axle portions.

FIG. 18 shows only the back left and back right axle assemblies 41, 42 of the arrangement of FIG. 17. As typically the motor speed is geared down between the motor and the axle shafts, back left and back right motor gearboxes 151, 152 are shown. An example of the gears within the left motor gearbox 151 is shown in FIG. 19, where a pinion or motor shaft gear 162 is shown in the motor shaft 161. The motor shaft gear engages with a first intermediate gear 163 of larger diameter which is on a common shaft with a second intermediate gear 164 of smaller diameter. The second intermediate gear engages with the shaft inner gear 166 which is preferably of large diameter.

As the angle range required at the inner ends of the swinging axle first portion 51 is far smaller than that of earlier embodiments, the inner rotatable coupling 71 can provide sufficient angle accommodation with acceptably low friction variation. The inner rotatable coupling 71 is shown in FIG. 19 as a CV joint and is enclosed in FIG. 18 by the inner bellows 84 without the need for an inner shaft locator. Although CV joints allow a small amount (typically 20 mm) of plunge, that is still insufficient to accommodate the axle shaft portion length change with tilt and suspension motion, which requires the continued presence of the axle sliding connection such as a ball spline, so the axle shaft bellows 85, 125 are shown in FIG. 18.

Figure 20:
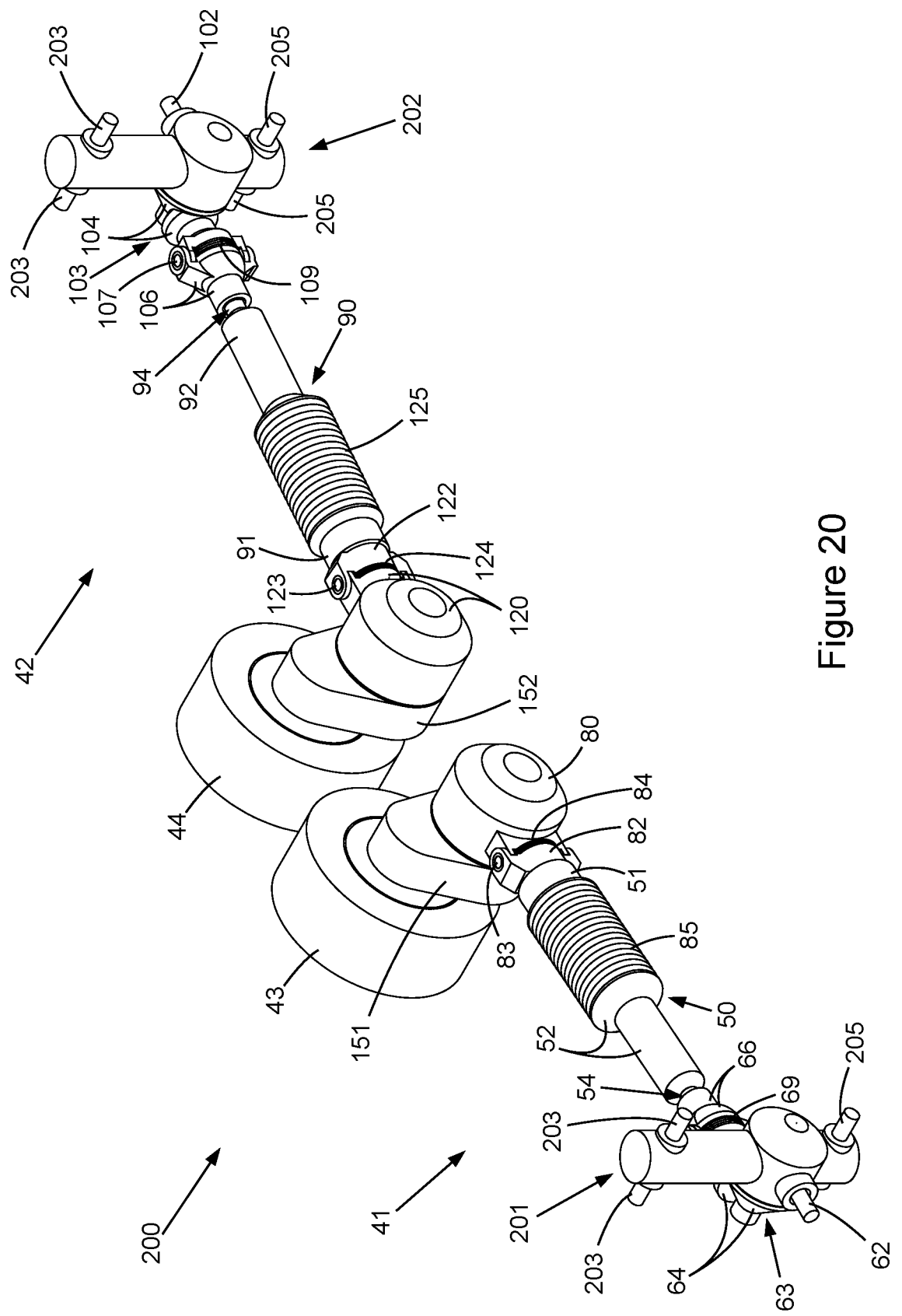
FIG. 20 is a perspective view of a back axle arrangement for an alternative back suspension arrangement according to the present invention.

FIG. 20 shows one possible embodiment of the present invention to suit an independently suspended vehicle, such as a four-wheel drive with independent wheel geometry and long suspension travel. The ability of the present invention to accommodate large angles in the path of the axle assembly allows motors 43, 44 to drive the wheel shafts 62, 102. The arrangement can also allow for significant droop angle of each axle shaft at ride height as large angles in the path of transmission are accommodated with ease, as is significant axle shaft length change. This can allow for components near the centre of the vehicle to have a larger ground clearance than with conventional drive arrangements.

Each wheel shaft 62, 102 is located in a respective back left or back right suspension upright and hub part 201, 202, which each have upper link pivots 203 for attaching an upper wishbone or suspension links, and each have lower link pivots 205 for attaching a lower wishbone or suspension links. The outer gear carriers 64, 104 each rotate relative to the respective back left or back right suspension upright and hub.

FIG. 20 also shows a further alternative motor location and orientation. The back left and back right inner gear carriers 80, 120 rotate relative to the respective motor gearbox 151, 152.

In the embodiments shown in FIGS. 1 to 20, the back wheels are relatively widely spaced, so the back axle assemblies can extend primarily laterally. The inner and outer bevel gear arrangements are used to provide a larger than usual change of transmission angle, well above that of a CV joint. These large angles of for example over fifty degrees in either direction (a total of over one hundred degrees) can occur with some automotive wheel geometries such as in tilting vehicles and in extreme off-road vehicles. The bevel gear arrangements do not allow for horizontal motions of the axle with motion of the bridges during tilt and with linear suspension travel of the wheel hubs relative to the bridges. This can be due to mount deflections for example, or rake angle causing wheel fore-aft motion. Additionally a length change is typically also present during the range of motions, so one of the axle sections must include a spline or similar to accommodate the length change required of the axle assembly.

Two rotatable couplings are required to allow for the swinging of the axle assembly in at least a horizontal plane, with both ends of the axle assembly (the input shaft and the wheel shaft) being constrained in their alignment. These two rotatable couplings together with the swinging freedom from the inner and outer bevel gear arrangements and the ability of the axle assembly to change in length would undesirably allow the central portion of the axle assembly (i.e. the swinging shaft) to drop. This is prevented by providing the inner and outer shaft locators which sit around the rotatable couplings and effectively provide a hinge constraint that allows for the horizontal deflection (relative to the vehicle body) between ends of the axle during motion, but due to the relatively vertical hinge pivot axes, prevents the rotatable couplings from allowing the swinging part of the axle to drop.

These same components can be adapted for use where the space between the back wheels is relatively narrow, by orienting the axle assembly so that it extends primarily longitudinally of the vehicle.

In the case of FIGS. 1 to 16 and 20 to 33, the axle assembly can include an inner shaft 73, a swinging shaft 50 and an outer shaft 57. The inner shaft 73 can have a primary axis that is constrained to resist motion relative to a vehicle chassis, subframe or body in three mutually perpendicular linear directions (i.e. all linear directions) and be free to spin about a rotational direction that is around the inner shaft primary axis. The outer shaft 57 has a primary axis that is constrained to resist motion relative to a wheel hub assembly in three mutually perpendicular linear directions and is free to spin about a rotational direction that is around the outer shaft primary axis. The swinging shaft has a primary axis and includes an inner end and an outer end. An inner rotatable coupling 71 is connected between the inner end 70 of the swinging shaft 50 and the inner shaft 73. The inner shaft 73 includes a shaft inner bevel gear 72 engaging directly or indirectly with an input bevel gear 77 rotatable about an input bevel gear spinning axis. The input bevel gear spinning axis is located in an inner gear carrier 80. The inner gear carrier 80 is rotatably mounted relative to the vehicle chassis, subframe or body about an axis that is both perpendicular to the inner shaft primary axis and perpendicular to a horizontal axis perpendicular to the inner shaft primary axis. The horizontal axis remains horizontal relative to the vehicle body.

The shaft inner bevel gear 72 is located by the inner gear carrier 80 and able to rotate relative to the inner gear carrier about the inner shaft primary axis. An inner shaft locator 82 is pivotally connected to the inner gear carrier 80, to pivot about an inner shaft locator pivot which passes through the inner rotatable coupling, and is both perpendicular to the swinging shaft primary axis and perpendicular to a horizontal axis perpendicular to the swinging shaft primary axis. The horizontal axis remains horizontal relative to the vehicle body. The inner end of the swinging shaft is located by the inner shaft locator 82 and able to rotate relative to the inner shaft locator about the swinging shaft primary axis.

An outer rotatable coupling 55 is connected between the outer end 54 of the swinging shaft 50 and the outer shaft 57. The outer shaft includes a shaft outer bevel gear 56 engaging directly or indirectly with an output bevel gear (61) on a wheel shaft 62, the wheel shaft having a primary axis being the wheel shaft axis and being located relative to a wheel hub assembly.

An outer gear carrier 64 is rotatably mounted to the wheel hub assembly, being rotatable relative to the wheel hub assembly about an axis that is both perpendicular to the outer shaft primary axis and perpendicular to a horizontal axis that is perpendicular to the outer shaft primary axis. The shaft outer bevel gear 56 is being located by the outer gear carrier and able to rotate relative to the outer gear carrier about the outer shaft primary axis.

An outer shaft locator 66 is pivotally connected to the outer gear carrier 64, to pivot about an outer shaft locator pivot axis which passes through the outer rotatable coupling 55 and is both perpendicular to the swinging shaft primary axis and is perpendicular to a horizontal axis perpendicular to the swinging shaft primary axis. The outer end 54 of the swinging shaft 50 is located by the outer shaft locator 66 and able to rotate relative to the outer shaft locator about the swinging shaft primary axis.

One of the inner shaft, swinging shaft or outer shaft includes first and second shaft portions, the first shaft portion of said shaft being slidably connected to the second shaft portion of said shaft to enable a length of said shaft to vary along the primary axis of said shaft, the first and second shaft portions of said shaft being drivably connected such that rotations of the first and second shaft portions about the primary axis of said shaft are equal.

Preferably, and as shown in the Figures, when the one of the inner shaft, swinging shaft or outer shaft which includes the first and second shaft portions is the swinging shaft, the first shaft portion 51 of the swinging shaft 50 is slidably connected by a slidable connection 53 to the second shaft portion 52 of the swinging shaft to enable a total length of the swinging shaft to vary along the primary axis of the swinging shaft. The first and second shaft portions 51, 52 of the swinging shaft are drivably connected by the slidable connection 53 such that rotation of the first and second shaft portions about the primary axis of the swinging shaft are equal. The swinging shaft first portion 51 is an inner portion including the inner end 70 of the swinging shaft 50 connected to the inner rotatable coupling 71. The swinging shaft second portion 52 is an outer portion including the outer end 54 of the swinging shaft 50 connected to the outer rotatable coupling 55.

The inner bevel gear arrangement 79 includes at least the shaft inner bevel gear 72 and the input bevel gear 77. The outer bevel gear arrangement 63 includes at least the shaft outer bevel gear 56 and the output bevel gear 59.

When the shaft outer bevel gear engages indirectly with the output bevel gear on the output shaft, the shaft outer bevel gear 56 engages with at least one intermediate outer bevel gear 58, 60 that in turn engages with the output bevel gear 61 on the wheel shaft 62. The at least one intermediate outer bevel gear can rotate about an intermediate outer bevel gear axis substantially perpendicular to the output shaft axis. With this arrangement, the outer shaft and the wheel shaft can be aligned as in FIGS. 5 to 8 and in FIG. 20.

Alternatively, when the shaft outer bevel gear 56 engages directly with the output bevel gear 61 on the wheel shaft 62, the outer shaft and the wheel shaft can be perpendicular, as in FIGS. 21 to 33.

Figure 21:
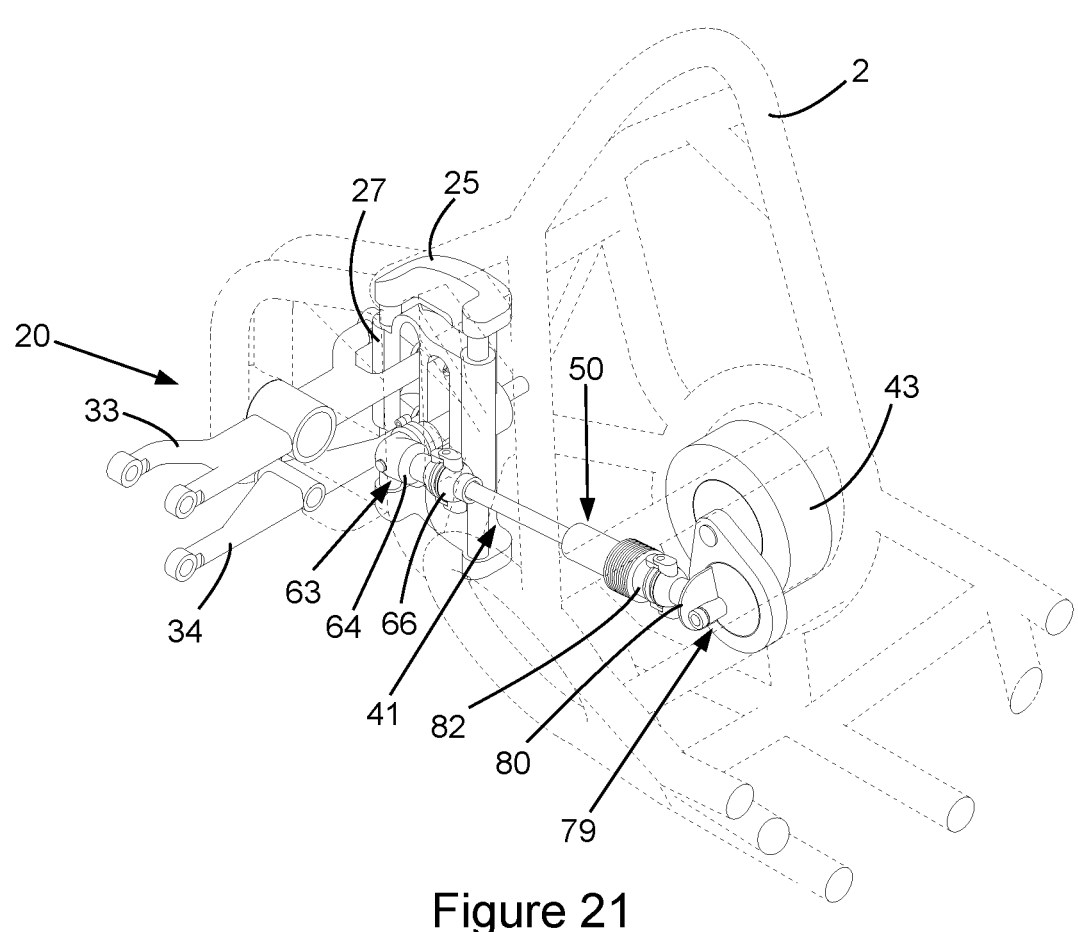
FIG. 21 is a perspective partial hidden line view of a vehicle frame and a back suspension arrangement according to the present invention.

Referring now to FIG. 21 the rear portion of a frame of a vehicle body 2 is shown in dashed lines to reveal a portion of a back suspension arrangement 20 including the back left axle assembly 41. The back left wheel hub assembly 25 is also shown which slides on the back left suspension upright 27. The main bridge 33 and the additional suspension geometry link 34 (here, a second bridge) are both pivoted to the frame of the body 2 and the left hand distal ends of each are pivotally connected to the suspension upright to enable a tilting motion of typically up to fifty degrees to the left and fifty degrees to the right. The main bridge 33 is shorter than in the earlier drawings to allow for a much narrower track of the back wheels. However such a narrow track arrangement makes packaging the primarily laterally extending back axle assemblies of the earlier drawings impossible while maintaining functionality at large lean angles of the vehicle. In the present embodiment, the back left axle assembly 41 instead extends primarily longitudinally to allow for the large motions of the wheel hub assembly 25 relative to the body 2.

Figure 22:
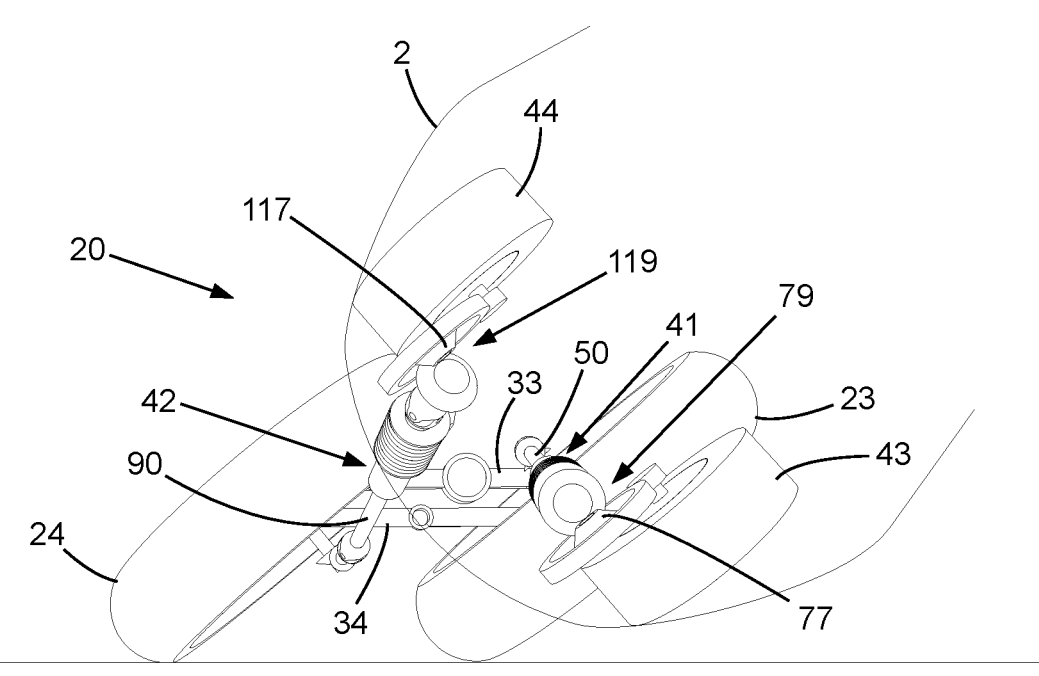
FIG. 22 is a perspective partial view of a vehicle body and the back suspension arrangement of FIG. 21 in a tilted state.

FIG. 22 shows the back suspension arrangement 20 with narrowly spaced back left and back right wheels 23, 24. The wheels and the body 2 are tilted over forty degrees to the left. As the vehicle is tilted, the distance between the back left and back right wheels 23, 24 reduces further. The outer casings and housings of the back left and back right axle assemblies 41, 42 are omitted in FIG. 22 to allow the swinging rotation of the swinging shafts 50, 90 around the input bevel gear 77, 117 to be seen within the back left and back right inner bevel gear arrangements 79, 119.

Figure 23:
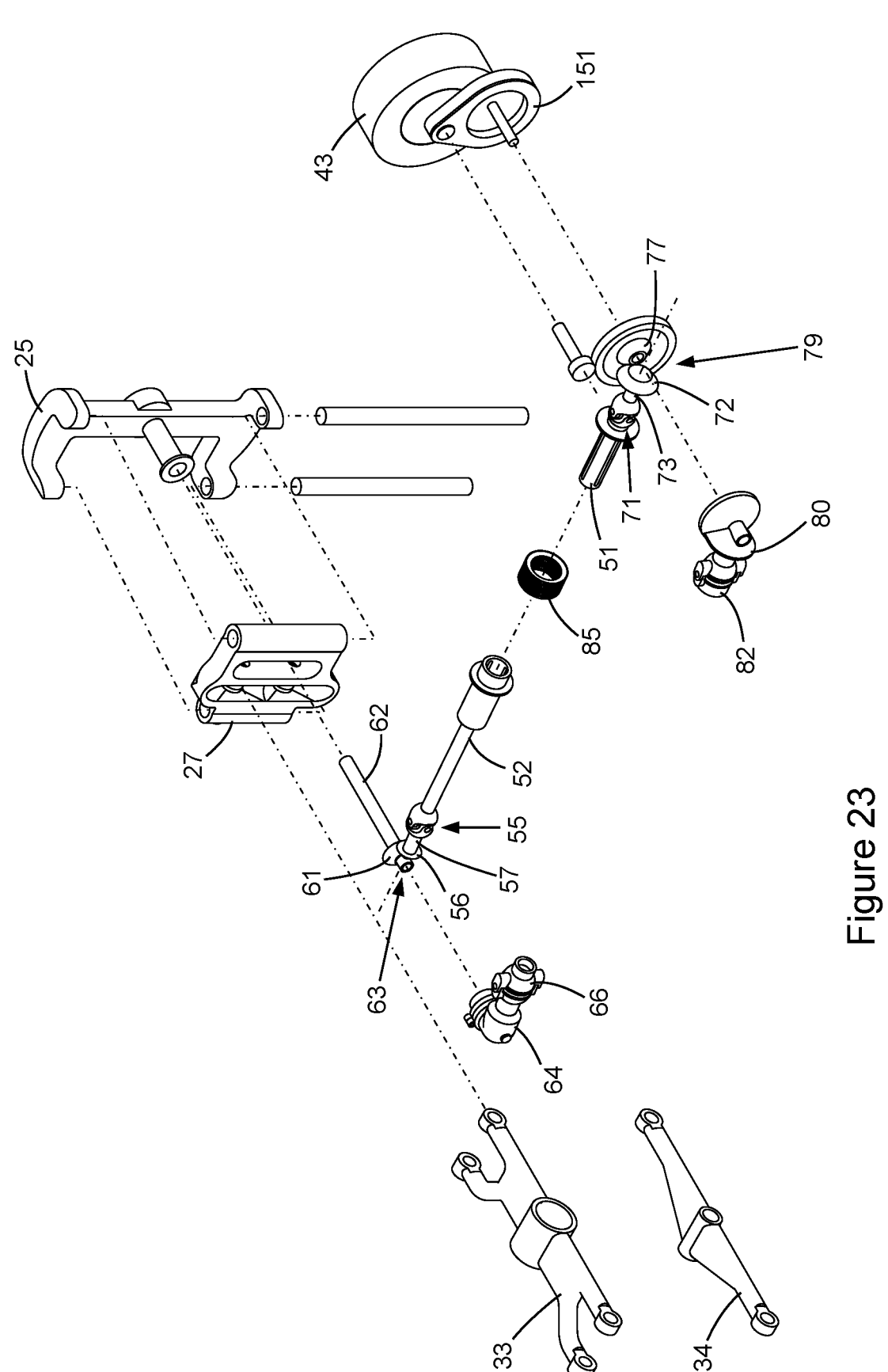
FIG. 23 is a perspective partial exploded view of the back suspension arrangement of FIG. 21.

The components of the portion of the back suspension arrangement shown in FIG. 21 are shown in the exploded view of FIG. 23. The back left hub assembly 25 is assembled by sliding the rods into the body of the hub while the beck left suspension upright 27 is in place. The suspension upright is connected to the main bridge 33 and the additional suspension geometry link 34. The wheel shaft 62 including the output gear 61 is assembled into the hub assembly 25. The outer gear carrier 64 (which locates the output bevel gear 61 and the shaft outer bevel gear 56 of the outer bevel gear arrangement 63) is assembled to the wheel hub 25 so that it can rotate about the primary axis of the wheel shaft 62 to allow the swinging shaft first and second portions 51, 52 to swing about the primary axis of the wheel shaft.

The shaft outer bevel gear 56 is connected to the outer rotatable coupling 55 by the outer shaft 57. The outer shaft locator 66 is pivoted to the outer gear carrier 64 to support the outer end of the swinging shaft second portion 52 in a vertical direction while allowing the swinging shaft to swing laterally. The swinging shaft first portion 51 slides into the swinging shaft second portion 52 with the bellows 85 preventing dirt ingress into the slidable connection therebetween. The inner end of the swinging shaft first portion 51 is connected to the inner rotatable coupling 71. The inner shaft locator 82 is pivoted to the inner gear carrier 80 to support the inner end of the swinging shaft first portion 51 in a vertical direction while allowing the swinging shaft to swing laterally.

The inner gear carrier 80 (which locates the shaft inner bevel gear 72 and the input bevel gear 77 of the inner bevel gear arrangement 79) is assembled to the motor gearbox 151 of the back left motor 43 so that the inner gear carrier can rotate about the primary axis of the input bevel gear 77 to allow the swinging shaft first and second portions 51, 52 to swing about the primary axis of the input bevel gear.

Figure 24:
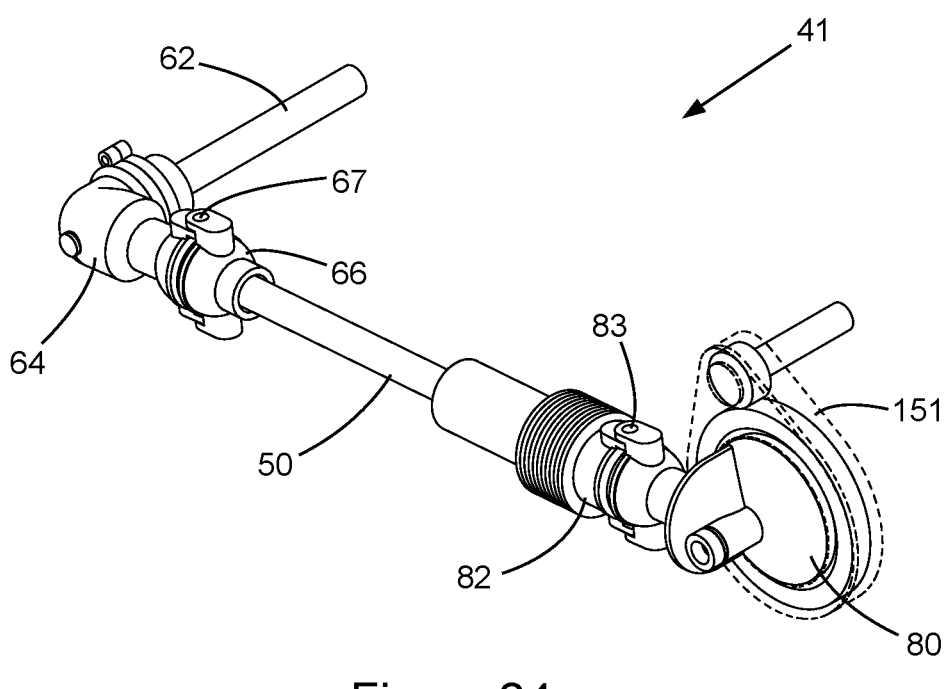
FIG. 24 is a perspective partial hidden line view of the axle assembly shown in FIG. 21.

In FIG. 24, the inner gear carrier 80 is shown assembled to the back left motor gearbox 151 (shown in dashed lines). The back left axle assembly 41 is shown with the outer casings and housings such as the inner gear carrier 80, the inner shaft locator 82, the outer shaft locator 66 and the outer gear carrier 64. The pivot 83 forms the hinge like connection between the inner gear carrier 80 and the inner shaft locator 82. Similarly the pivot 67 forms the hinge like connection between the outer shaft locator 66 and the outer gear carrier 64.

Figure 25:
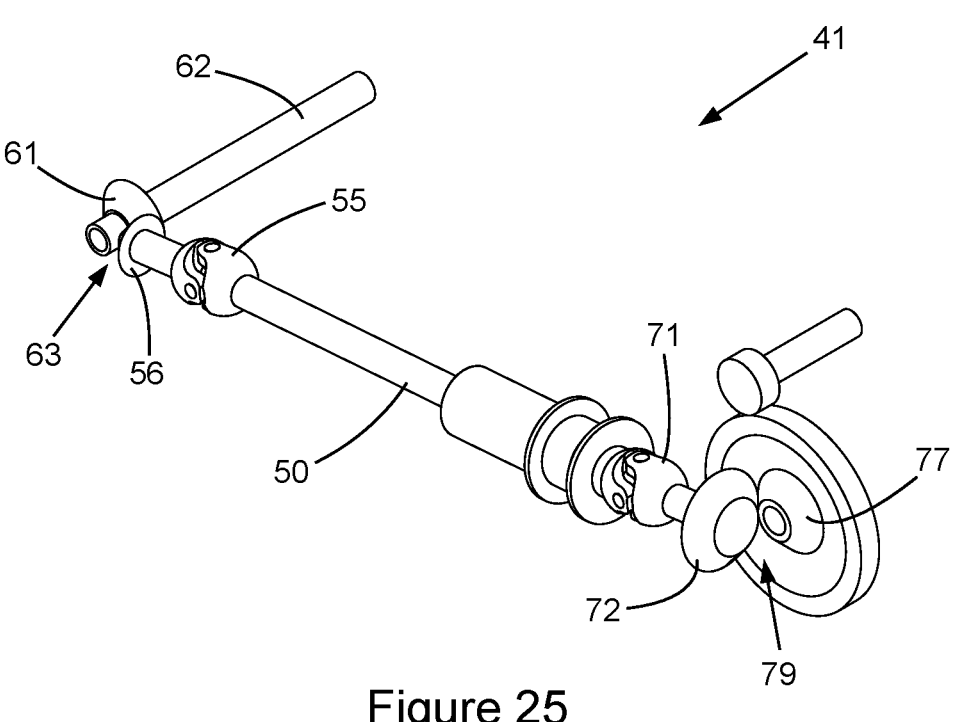
FIG. 25 is a perspective view of the shafts and gears within the axle arrangement shown in FIG. 24.

In FIG. 25, the outer casings and housings of the back left axle assembly are omitted to enable the internal features to be seen. These are the output bevel gear 61 and the shaft outer bevel gear 56 of the outer bevel gear arrangement 63, the outer rotatable coupling 55, the inner rotatable coupling 71, and the shaft inner bevel gear 72 and the input bevel gear 77 of the inner bevel gear arrangement 79.

Figure 26:
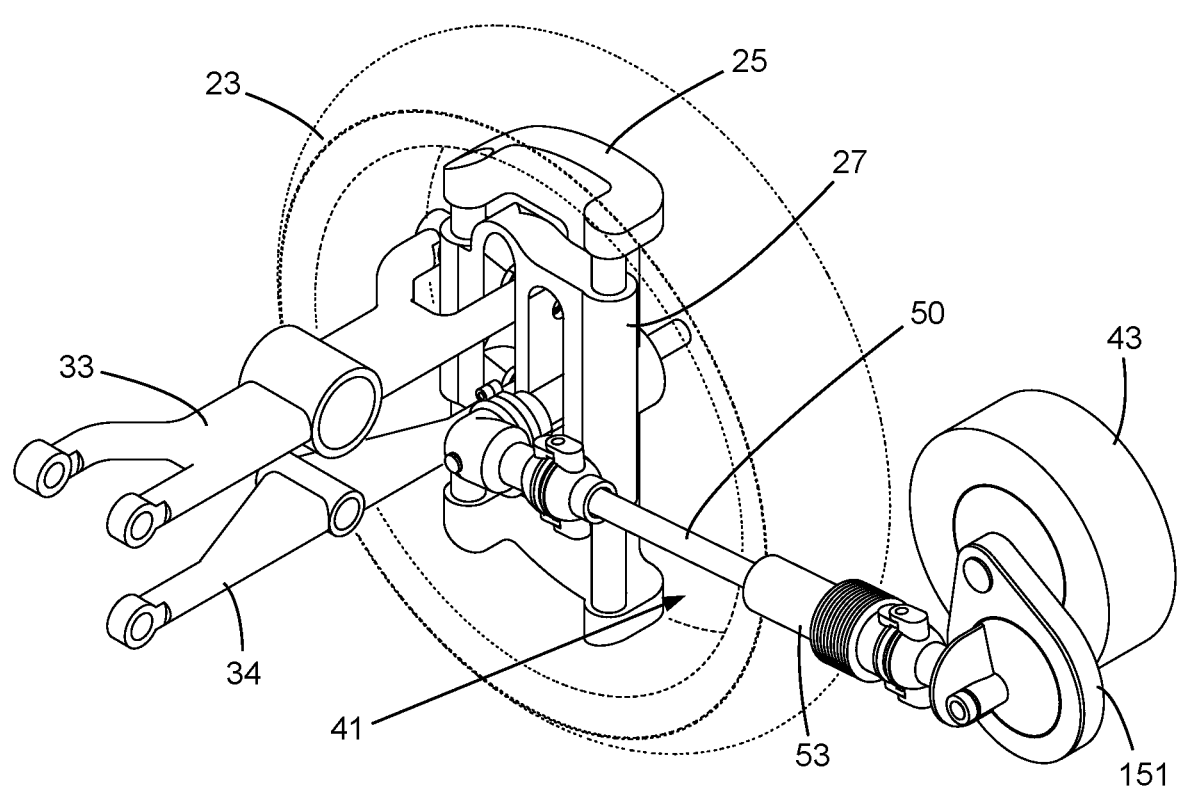
FIG. 26 is a perspective partial hidden line view of the back suspension arrangement shown in FIG. 21 showing the back left wheel and axle assemblies.

FIG. 26 shows the back left axle assembly 41, the back left motor 43 and gearbox 151, the back left wheel hub assembly 25, the back left suspension upright 27 and the main bridge 33 and additional suspension geometry link 34. The back left wheel is shown in dashed lines. The back left wheel hub assembly 25 and the back left suspension upright 27 are located within the cavity inside the rim of the back left wheel 23. Where the swinging shaft 50 passes the rim and tyre of the back left wheel it is relatively small in diameter, the increase in diameter of the slidable connection 53 in the swinging shaft being located largely forwards of the back left wheel.

Figure 27:
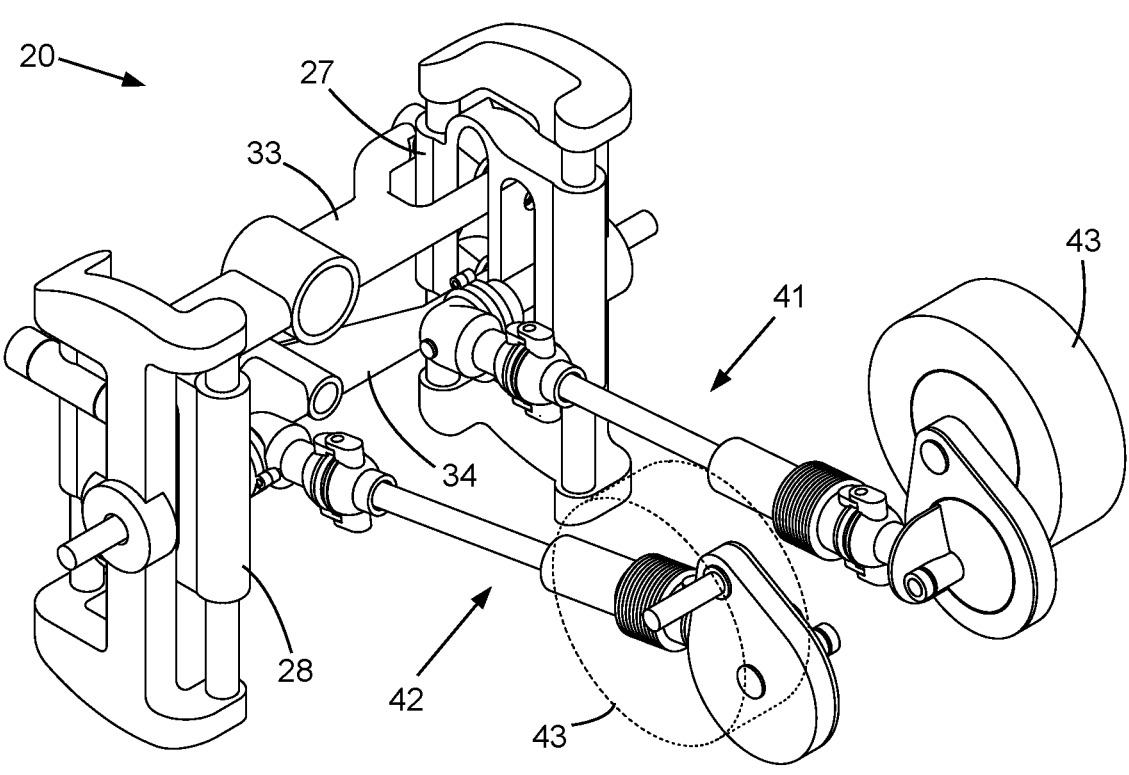
FIG. 27 is a perspective partial hidden line view of the back suspension arrangement shown in FIG. 21 showing the back left and back right axle assemblies.

FIG. 27 shows the back suspension arrangement 20 including the main bridge 33 and the additional suspension geometry link 34 which are each pivoted to both the back left and back right suspension uprights 27, 28. The back right wheel motor is shown in dashed lines to enable more of the back right swinging shaft slidable connection 93 to be seen.

Figure 28:
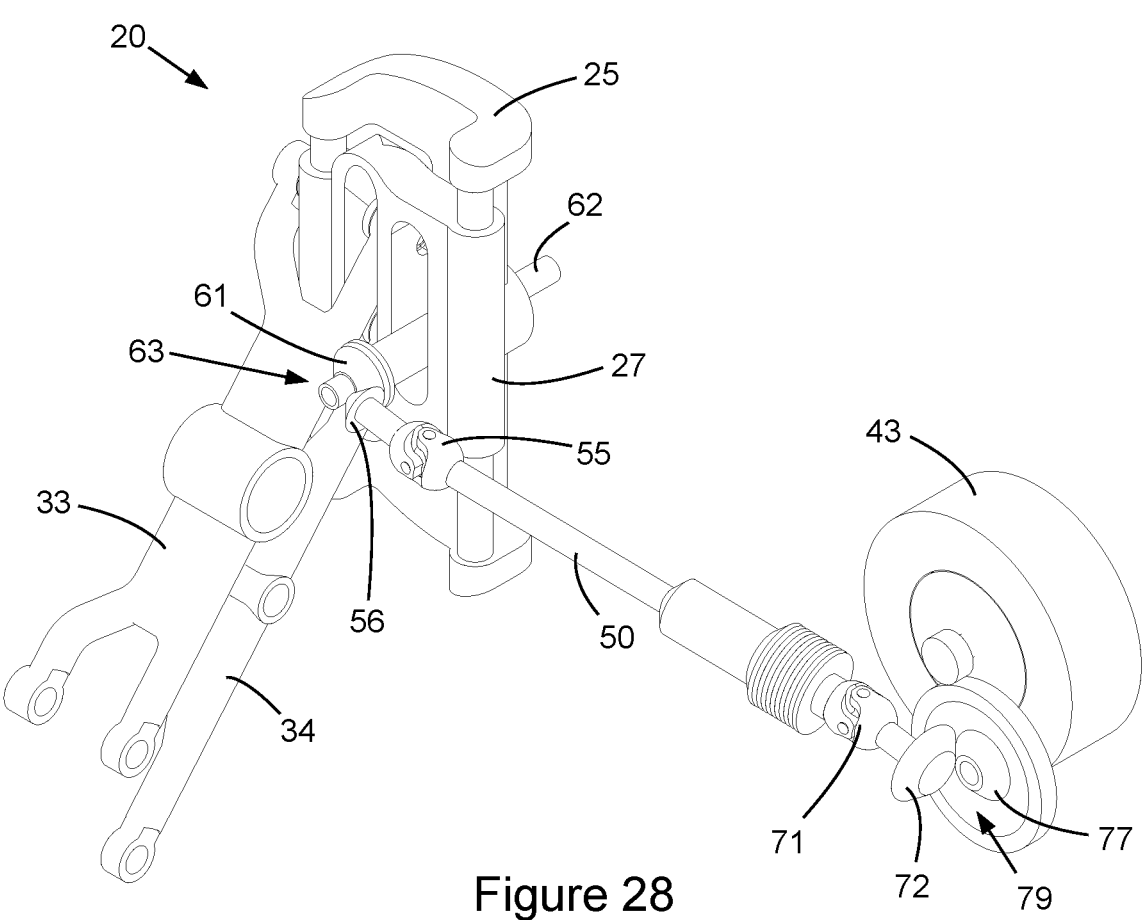
FIG. 28 is a perspective partial view from the vehicle body of the back suspension arrangement shown in FIG. 21 when the vehicle is tilted to the left.

FIG. 28 is a perspective view of the back left axle assembly 41, motor 43, wheel hub assembly 25, suspension upright 27 and the main bridge 33 and additional suspension geometry link 34, when the vehicle is tilted to the left. The view is from or relative to the vehicle. The outer casings and housings of the axle assembly have been omitted to enable the swinging operation of the inner and outer bevel gear arrangements 79, 63 to be seen. Relative upwards swinging of the swinging shaft 50 around the primary axis of the input bevel gear 77 of the inner bevel gear arrangement 79 can be seen, particularly when compared to the opposite direction tilt state shown in FIG. 30. Similarly, the rotation of the swinging shaft 50 around the wheel shaft and the primary axis of the output bevel gear 61 can be seen, particularly when compared to the opposite direction tilt state shown in FIG. 30.

Figure 29:
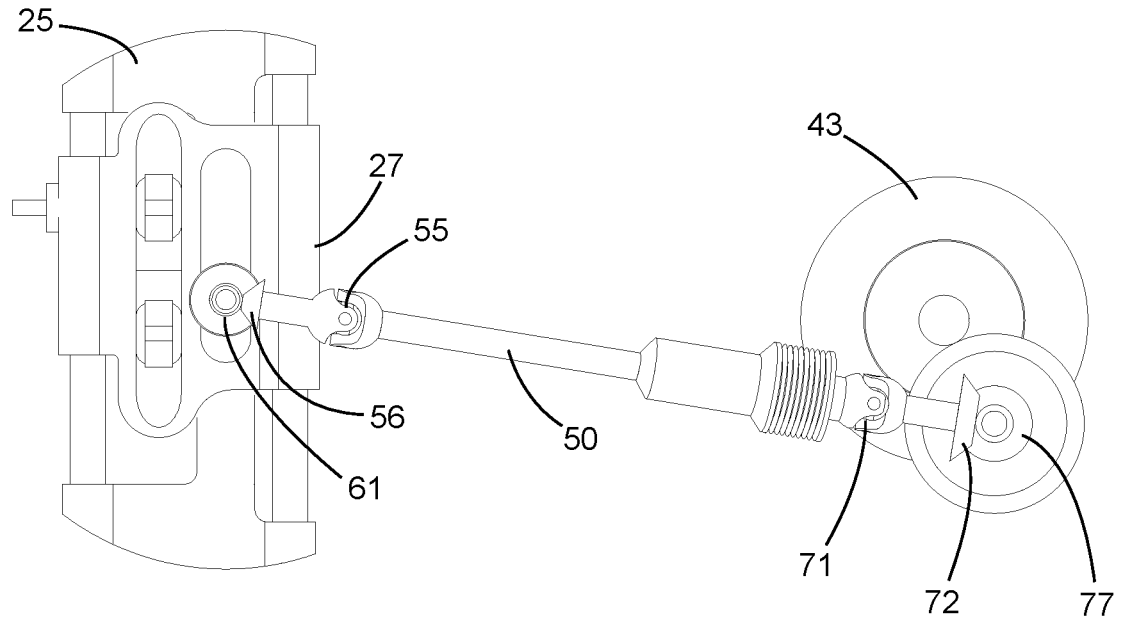
FIG. 29 is a view along the wheel shaft of the back suspension arrangement tilted to the left of FIG. 28.

FIG. 29 is a side view of the back left axle assembly 41, motor 43, wheel hub assembly 25 and suspension upright 27 in the same left tilted vehicle state as FIG. 28. FIG. 29 is viewed from a lateral position oriented relative to the vehicle body. Again, relative upwards swinging of the swinging shaft 50 around the primary axis of the input bevel gear 77 of the inner bevel gear arrangement 79 can be seen, particularly when compared to the opposite direction tilt state shown in FIG. 31. Similarly, the rotation of the swinging shaft 50 around the primary axis of the output bevel gear 61 can be seen, particularly when compared to the opposite direction tilt state shown in FIG. 31.

Figure 30:
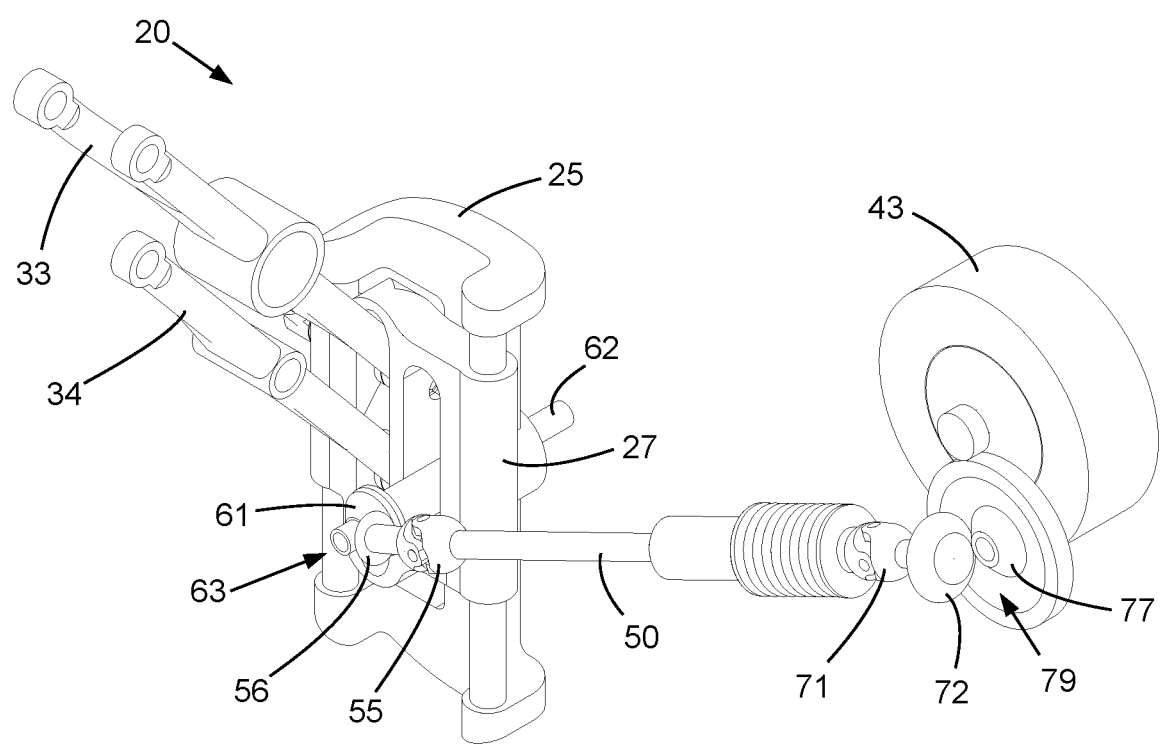
FIG. 30 is a perspective partial view from the vehicle body of the back suspension arrangement shown in FIG. 21 when the vehicle tilted to the right.

FIG. 30 is a perspective view of the back left axle assembly 41, motor 43, wheel hub assembly 25, suspension upright 27 and the main bridge 33 and additional suspension geometry link 34, when the vehicle is tilted to the right. As with FIGS. 28 and 29, the view is from or relative to the vehicle and again the outer casings and housings of the axle assembly have been omitted to enable the swinging operation of the inner and outer bevel gear arrangements 79, 63 to be seen. Relative downwards swinging of the swinging shaft 50 around the primary axis of the input bevel gear 77 of the inner bevel gear arrangement 79 can be seen, particularly when compared to the opposite direction tilt state shown in FIG. 28. Similarly, the rotation of the swinging shaft 50 around the wheel shaft and the primary axis of the output bevel gear 61 can be seen, particularly when compared to the opposite direction tilt state shown in FIG. 28.

Figure 31:
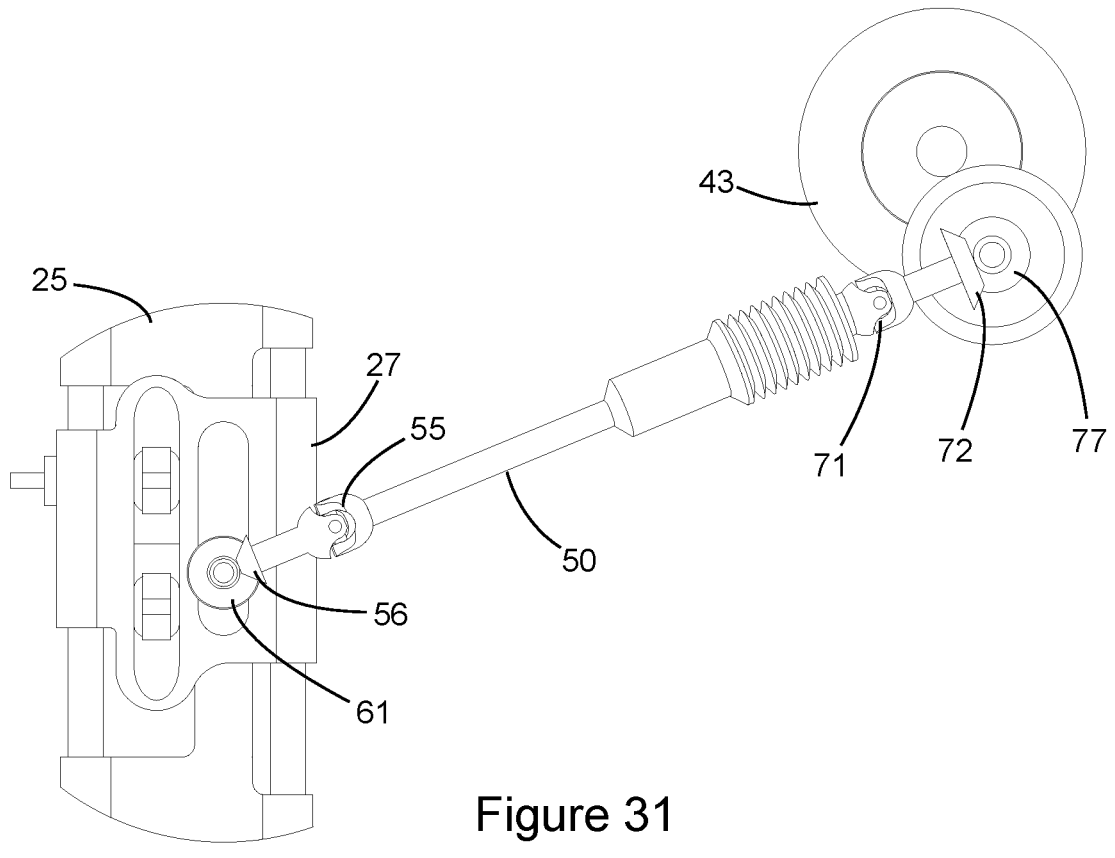
FIG. 31 is a view along the wheel shaft of the back left suspension arrangement tilted to the right of FIG. 30.

FIG. 31 is a side view of the back left axle assembly 41, motor 43, wheel hub assembly 25 and suspension upright 27 in the same right tilted vehicle state as FIG. 30. FIG. 31 is viewed from a lateral position oriented relative to the vehicle body. The relative downwards swinging of the swinging shaft 50 around the primary axis of the input bevel gear 77 of the inner bevel gear arrangement 79 can be seen, particularly when compared to the opposite direction tilt state shown in FIG. 29. Similarly, the rotation of the swinging shaft 50 around the primary axis of the output bevel gear 61 can be seen, particularly when compared to the opposite direction tilt state shown in FIG. 29.

Figure 32:
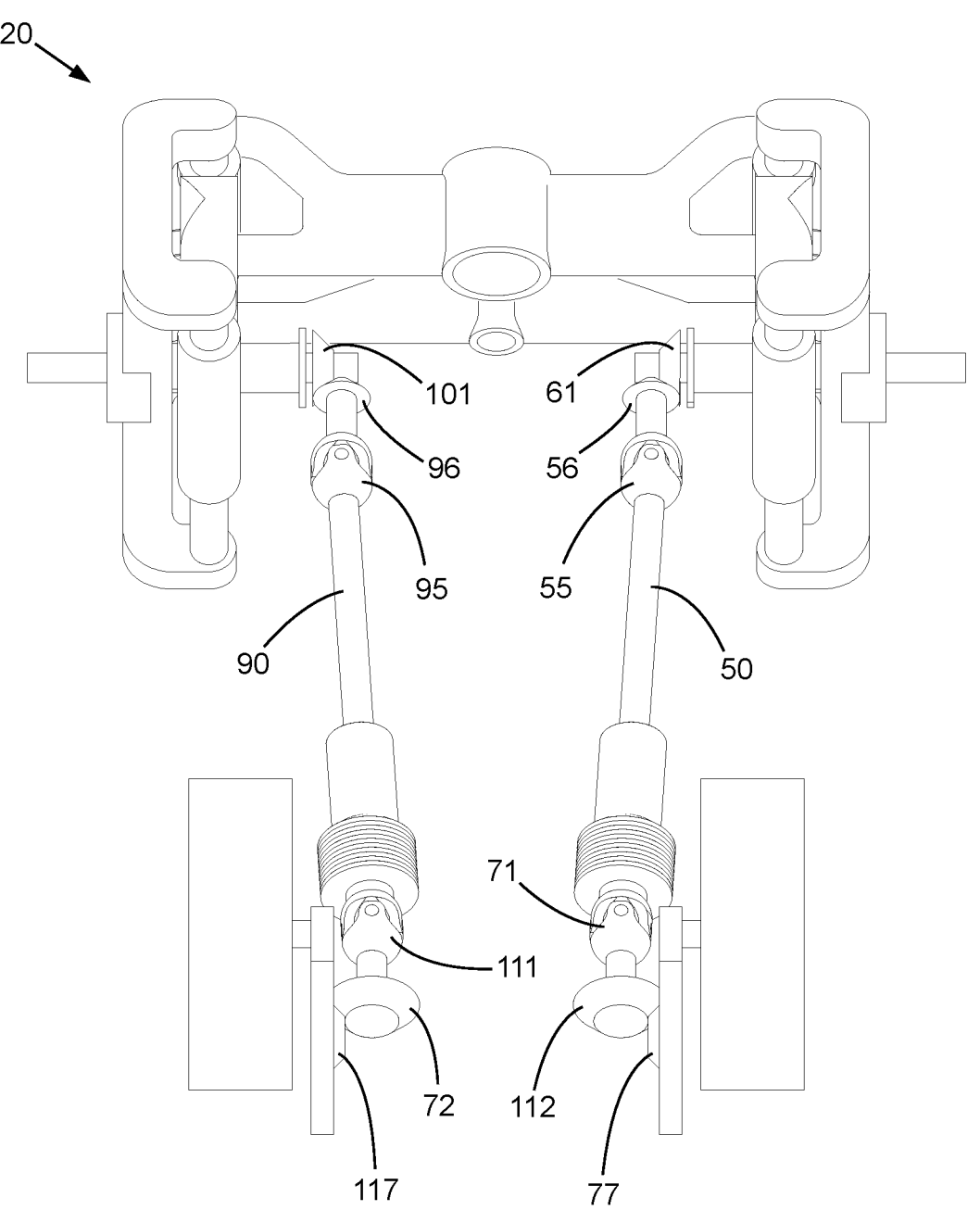
FIG. 32 is a perspective partial view from the vehicle body looking backwards of the back suspension arrangement when the vehicle is level, i.e. not tilted.

FIG. 32 is a perspective view of the back suspension arrangement 20, viewed from the vehicle body when the vehicle is level or not tilted. The axle assembly casings and housings have been omitted to enable comparison with the tilted view of FIG. 33 by being able to view of the operation of the inner bevel gear arrangements 79, 119, the inner rotatable couplings 71, 111, the outer rotatable couplings 55, 95, and the outer bevel gear arrangements 63, 103.

Figures 33, 34:
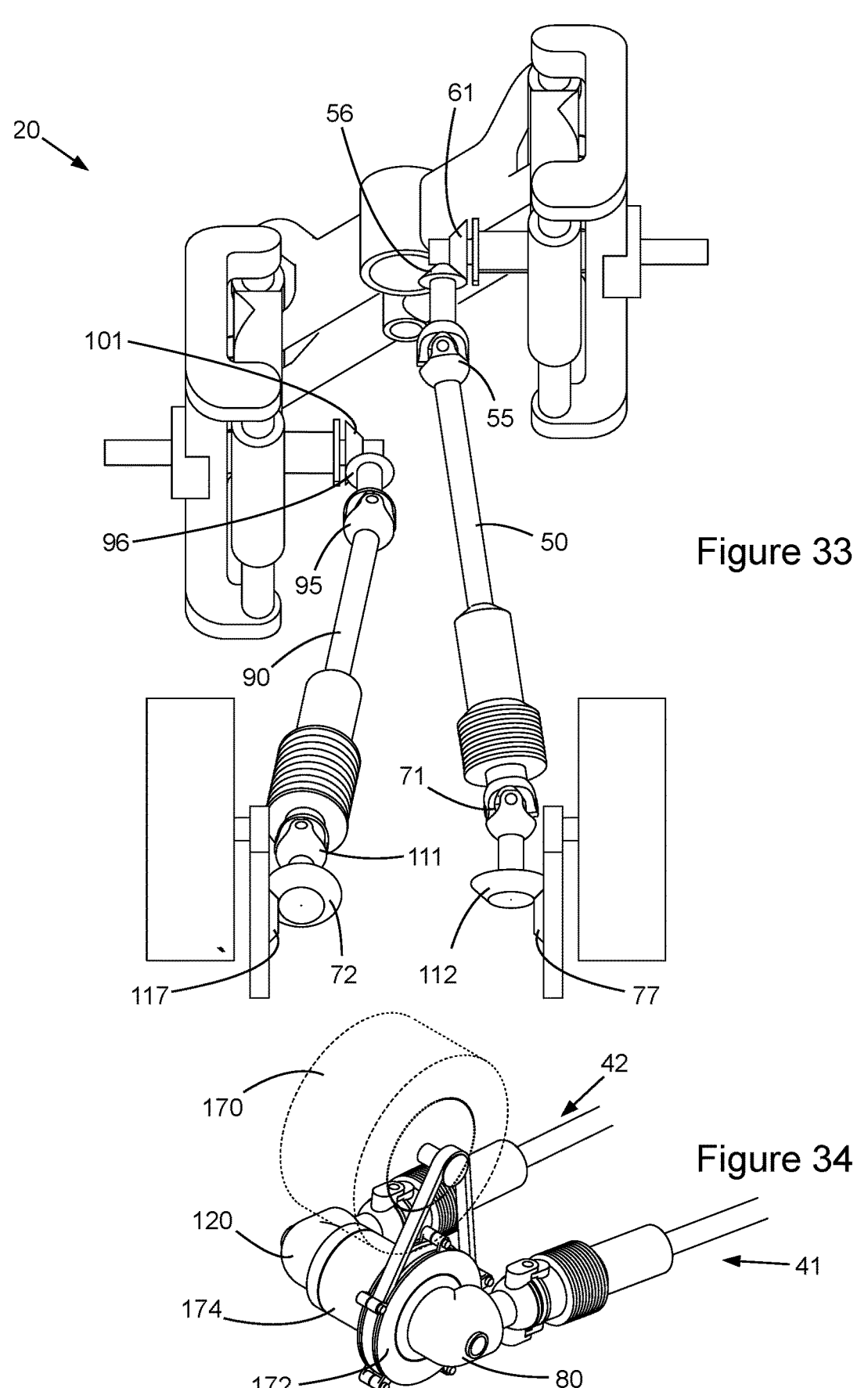
FIG. 33 is a perspective partial view from the vehicle body looking backwards of the back suspension arrangement of FIG. 32, but when the vehicle is tilted to the left.
FIG. 34 is a perspective partial view of the back left and back right axle assemblies driven by a single motor.

FIG. 33 is a perspective view of the back suspension arrangement 20, viewed from the vehicle body similar to FIG. 32, but in FIG. 33, the vehicle is tilted to the left. Comparing FIGS. 32 and 33 allows the lateral swinging of the swing shafts 50, 90 to be seen, from pointing outwards towards the back when the vehicle is level, to pointing inwards towards the back when the vehicle is tilted. This demonstrates the need for the inner and outer rotatable couplings 71, 111 and 55, 95. It also demonstrates the need for the hinge functions of the pivots between the inner gear carriers and the inner shaft locators and for the hinge functions of the pivots between the outer gear carriers and the outer shaft locators (not shown).

Comparing FIGS. 32 and 33 also demonstrates the rotations of the shaft inner bevel gears 72, 112 about the primary axes of the input bevel gears 77, 117 and the rotations of the shaft outer bevel gears 56, 96 about the primary axes of the output bevel gears 61, 101 to permit vertical swinging of the swinging shaft during tilt motions.

FIG. 34 shows a single motor 170 driving both wheels. The motor 170 drives an input pulley 172 of a differential 174. The left and right axle outputs of the differential drive the input bevel gears inside the left and right inner gear carriers 80, 120. The remainder of the back left and back right axle assemblies 41, 42 can be as shown and discussed in relation to FIGS. 21 to 33.

In any of the arrangements described herein, the bevel gears can be of differing sizes to provide a gear ratio if required.

As the axle assembly provides large angles of axle articulation along the axle path without detrimental or harmful friction loads at large articulation angle, the arrangement is particularly suited to axle assemblies that are required to articulate through angles of at least forty degrees through full suspension travel from suspension full compression to suspension full extension.

In many forms of the axle assembly, where the rotatable joints are provided to accommodate misalignment, not provide significant articulation of the axle, the angle required of the rotatable coupling can be small, within a region where fluctuations in velocity and/or torque are minimal. In this case, the rotatable couplings may a form of universal joint.

The axle assembly can be used in other application where it is desirable to transfer torque or rotary power using an axle that can deflect through large angles. It is particularly beneficial where rotational speeds are high and where there is sensitivity to or detrimental effect from frictional losses at the high rotational speeds and high axle deflection angles.

The invention claimed is:

1. An axle assembly for a vehicle, the axle assembly comprising:
   an input component for receiving rotational power from a motor, the input component mounted such that movement of the input component is constrained relative to a vehicle chassis, subframe or body in three mutually perpendicular linear directions whilst able to rotate about an input component axis;
   a swinging shaft rotatable about a swinging shaft primary axis;
   an inner rotatable coupling connected directly or indirectly between the input component and the swinging shaft;
   an outer bevel gear arrangement including at least a shaft outer bevel gear and an output bevel gear, the output bevel gear connected to or engaging directly or indirectly with a wheel shaft, the wheel shaft being connectable to a wheel of the vehicle and being constrained relative to a wheel hub assembly in three mutually perpendicular linear directions, whilst able to rotate about a wheel shaft axis;
   an outer rotatable coupling connected directly or indirectly between the shaft outer bevel gear and the swinging shaft; and
   at least one shaft locator arranged to prevent movement of the swinging shaft in a downward vertical direction relative to the shaft outer bevel gear and the input component;
   the axle assembly configured such that the axle assembly is extensible and contractable in length; and
   the outer bevel gear arrangement transferring rotational power from the outer rotatable coupling to the wheel shaft whilst facilitating tilting of the wheel shaft about a tilt axis that is:
   perpendicular to the wheel shaft axis; and
   aligned substantially longitudinally of the vehicle during use.

2. The axle assembly as claimed in claim 1, wherein an inner bevel gear arrangement is provided including at least a shaft inner bevel gear engaging directly or indirectly with an input bevel gear on an input shaft,
   the input component being the shaft inner bevel gear and the input component axis being a shaft inner bevel gear primary axis,
   the inner bevel gear arrangement transferring rotational power from the input shaft to the input component connected to the inner rotatable coupling on the swinging shaft, whilst facilitating swinging of the swinging shaft about an inner swinging axis that is perpendicular to the shaft inner bevel gear primary axis and aligned substantially horizontally relative to the vehicle chassis, subframe or body; and
   the at least one shaft locator comprises an outer shaft locator and an inner shaft locator.

3. The axle assembly as claimed in claim 2, including:
   an outer gear carrier rotatably mounted to the wheel hub assembly, being rotatable relative to the wheel hub assembly about an axis that is both perpendicular to a shaft outer bevel gear primary axis and perpendicular to a horizontal axis that is perpendicular to the shaft outer bevel gear primary axis,
   the shaft outer bevel gear being located by the outer gear carrier and able to rotate relative to the outer gear carrier about a shaft outer bevel gear primary axis,
   the outer shaft locator being pivotally connected to the outer gear carrier, to pivot about an outer shaft locator pivot axis which passes through the outer rotatable coupling and is both perpendicular to the swinging shaft primary axis and is perpendicular to a vehicle horizontal axis perpendicular to the swinging shaft primary axis, an outer end of the swinging shaft being located by the outer shaft locator and able to rotate relative to the outer shaft locator about the swinging shaft primary axis; and an inner gear carrier being rotatably mounted relative to the vehicle chassis, subframe or body about an axis that is both perpendicular to the shaft inner bevel gear primary axis and perpendicular to a vehicle horizontal axis perpendicular to the shaft inner bevel gear primary axis, the shaft inner bevel gear being located by the inner gear carrier (80) and able to rotate relative to the inner gear carrier about the shaft inner bevel gear primary axis, the inner shaft locator being pivotally connected to the inner gear carrier, to pivot about an inner shaft locator pivot which passes through the inner rotatable coupling and is both perpendicular to the swinging shaft primary axis and is perpendicular to a vehicle horizontal axis perpendicular to the swinging shaft primary axis.

4. The axle assembly as claimed in claim 3, wherein the outer bevel gear arrangement includes at least one intermediate bevel gear, the at least one intermediate bevel gear being rotatable about an intermediate bevel gear primary axis, the intermediate bevel gear primary axis being perpendicular to the shaft outer bevel gear primary axis and perpendicular to a primary axis of the output bevel gear, the at least one intermediate bevel gear being driven by the shaft outer bevel gear and driving the output bevel gear.

5. The axle assembly as claimed in claim 3, wherein in the outer bevel gear arrangement, the shaft outer bevel gear engages the output bevel gear, a shaft outer bevel gear primary axis being perpendicular to an output bevel gear primary axis.

6. The axle assembly as claimed in claim 1, wherein the motor is located by or fixed to a main bridge that is connected directly or indirectly between the vehicle chassis, subframe or body and the wheel hub assembly, the input component is a shaft inner gear, the at least one shaft locator is an outer shaft locator.

7. The axle assembly as claimed in claim 6, including:

an outer gear carrier rotatably mounted to the wheel hub assembly, being rotatable relative to the wheel hub assembly about an axis that is both perpendicular to a shaft outer bevel gear primary axis and perpendicular to a horizontal axis that is perpendicular to the shaft outer bevel gear primary axis, the shaft outer bevel gear being located by the outer gear carrier and able to rotate relative to the outer gear carrier about a shaft outer bevel gear primary axis, the outer shaft locator being pivotally connected to the outer gear carrier (64), to pivot about an outer shaft locator pivot axis which passes through the outer rotatable coupling and is both perpendicular to the swinging shaft primary axis and is perpendicular to a horizontal axis perpendicular to the swinging shaft primary axis, an outer end of the swinging shaft being located by the outer shaft locator and able to rotate relative to the outer shaft locator about the swinging shaft primary axis.

8. The axle assembly as claimed in claim 1, wherein the axle assembly is extensible and contractable in length within the swinging shaft which comprises a swinging shaft first portion connected to the inner rotatable coupling and a swinging shaft second portion connected to the outer rotatable coupling, the swinging shaft first portion being slidably connected to the swinging shaft second portion by a slidable connection to enable a total length of the swinging shaft to vary along the swinging shaft primary axis, the swinging shaft first portion and the swinging shaft second portion being drivably connected by the slidable connection such that rotation of the swinging shaft first portion and the swinging shaft second portion about the swinging shaft primary axis are equal.

9. The axle assembly as claimed in claim 8, including a ball spline between the swinging shaft first portion and the swinging shaft second portion to provide the slidable connection and to provide the drivable connection.

10. The axle assembly according to claim 1, wherein:

the outer rotatable coupling and/or the inner rotatable coupling is a form of universal joint or constant velocity joint.

11. A vehicle comprising the axle assembly according to claim 1, wherein during use the swinging shaft rotates through an angle of at least forty degrees through a combination of full tilt angle of a body and of wheels of the tilting vehicle and/or full suspension travel from suspension full compression to suspension full extension.

12. A vehicle comprising the axle assembly according to claim 1, and independent suspension where the swinging shaft swings through an angle of at least forty degrees through full suspension travel from suspension full compression to suspension full extension.

13. A back suspension arrangement for a tilting vehicle having at least one axle assembly according to claim 1, the back suspension arrangement including at least a back left wheel and a back right wheel, one said axle assembly being a back left axle assembly provided for the back left wheel and another said axle assembly being a back right axle assembly (42) provided for the back right wheel, the respective back left and back right wheels being connected to a respective wheel hub assembly, each slidably mounted on a respective one of a back left suspension upright and a back right suspension upright, the back left suspension upright being pivotally or rotatably connected to the back right suspension upright by at least a main bridge, the main bridge being pivotally connected to a body of the tilting vehicle, at least one additional suspension geometry link pivotally connected between the body and the back left suspension upright and/or the back right suspension upright, the back left and back right wheels, the respective hub assemblies, respective suspension uprights, the main bridge and the at least one additional suspension geometry link together forming at least a portion of a back suspension arrangement for the tilting vehicle.

14. The back suspension arrangement as claimed in claim 13 wherein the motor is a back left wheel motor for the back left axle assembly (41) and a back right wheel motor for the back right axle assembly.

15. The back suspension arrangement as claimed in claim 13 wherein the motor is a single motor from which the input components of the back left axle assembly and the back right axle assembly receive rotational power.

* * * * *